(12) United States Patent
Ophardt et al.

(10) Patent No.: US 9,205,438 B2
(45) Date of Patent: Dec. 8, 2015

(54) ROTATING KEYED DISPENSING CARTRIDGE SYSTEM

(71) Applicant: GOTOHTI.COM INC., Beamsville (CA)

(72) Inventors: Heiner Ophardt, Arisdorf (CH); Andrew Jones, Smithville (CA)

(73) Assignee: GOTOHTI.COM INC., Beamsville (CA)

( * ) Notice: Subject to any disclaimer, the term of this patent is extended or adjusted under 35 U.S.C. 154(b) by 39 days.

(21) Appl. No.: 13/969,048

(22) Filed: Aug. 16, 2013

(65) Prior Publication Data

US 2014/0054326 A1   Feb. 27, 2014

(30) Foreign Application Priority Data

Aug. 22, 2012   (CA) ..................................... 2787556

(51) Int. Cl.
| | |
|---|---|
| *B67D 7/06* | (2010.01) |
| *B05B 11/00* | (2006.01) |
| *A47K 5/12* | (2006.01) |
| *G01F 11/02* | (2006.01) |

(52) U.S. Cl.
CPC ............ *B05B 11/3001* (2013.01); *A47K 5/1207* (2013.01); *B05B 11/3059* (2013.01); *G01F 11/025* (2013.01)

(58) Field of Classification Search
CPC .... A47K 5/12; A47K 5/1207; B05B 11/3001; B05B 11/02; B05B 11/3059; B05B 11/306; B65D 47/34; B65D 83/76; G01F 11/025

USPC ................ 222/181.3, 185.1, 207, 325, 321.1, 222/321.7, 321.9, 153.04, 255, 383.1, 448, 222/560

See application file for complete search history.

(56) References Cited

U.S. PATENT DOCUMENTS

| | | | |
|---|---|---|---|
| 5,165,577 A | 11/1992 | Ophardt | |
| 5,676,277 A | 10/1997 | Ophardt | |
| 7,225,948 B2 * | 6/2007 | Ophardt et al. ............ | 222/181.3 |
| 7,980,421 B2 | 7/2011 | Ophardt et al. | |
| 8,113,388 B2 | 2/2012 | Ophardt et al. | |
| 8,413,852 B2 | 4/2013 | Ophardt et al. | |
| 8,464,912 B2 | 6/2013 | Ophardt et al. | |
| 8,479,950 B2 | 7/2013 | Ophardt et al. | |

\* cited by examiner

*Primary Examiner* — Frederick C Nicolas
*Assistant Examiner* — Bob Zadeh
(74) *Attorney, Agent, or Firm* — Thorpe North & Western, LLP

(57) ABSTRACT

A piston of a piston pump adapted to be selectively coaxially slidably coupled to a complementary actuator mechanism by a keying arrangement utilizing one or more key elements engaging with one or more keyways, to place the piston and actuator mechanism in rotational alignment about the axis and with keying involving complementary circumferential location of keying elements and keyways, complementary radial extents of key members and keyways relative the axis, and/or complementary shapes for the key elements and keyways normal the axis.

22 Claims, 39 Drawing Sheets

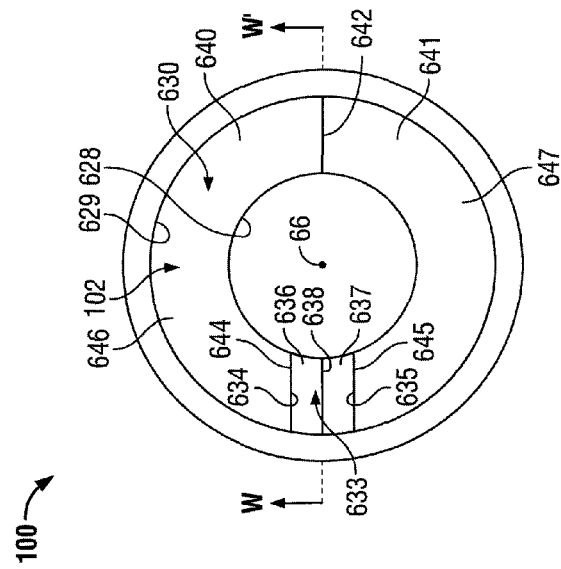
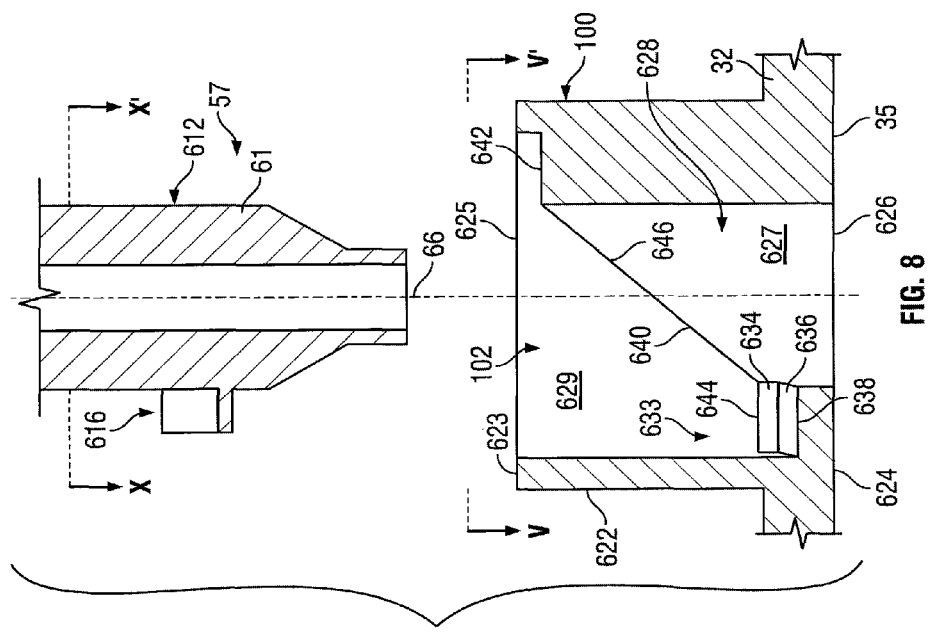

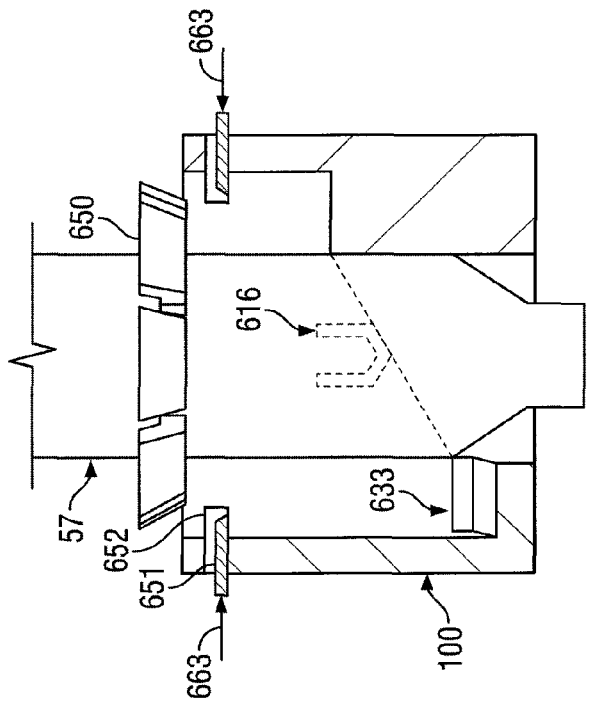
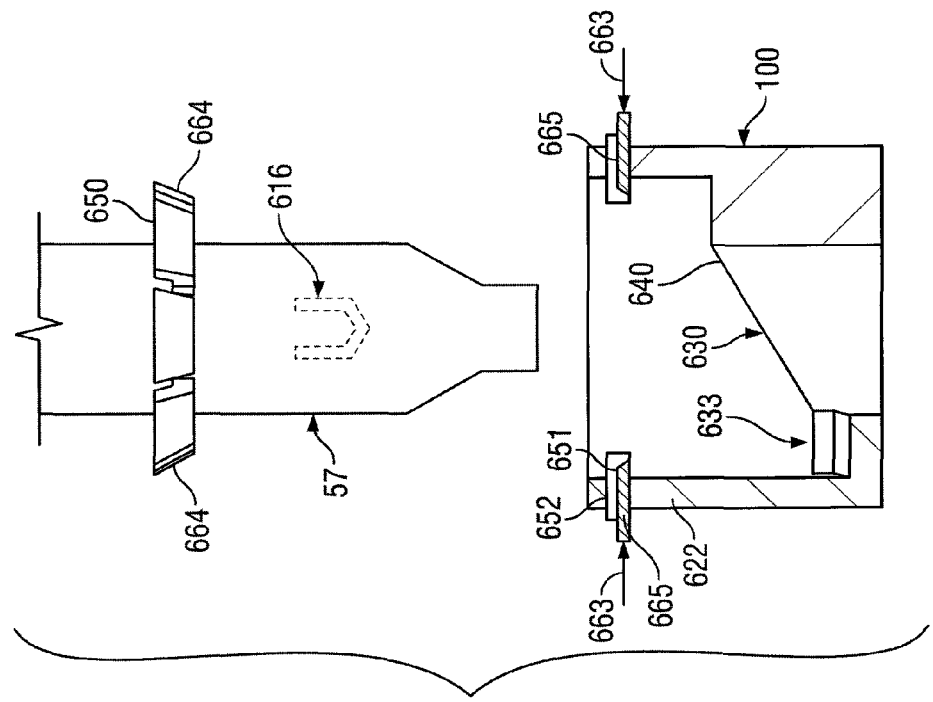

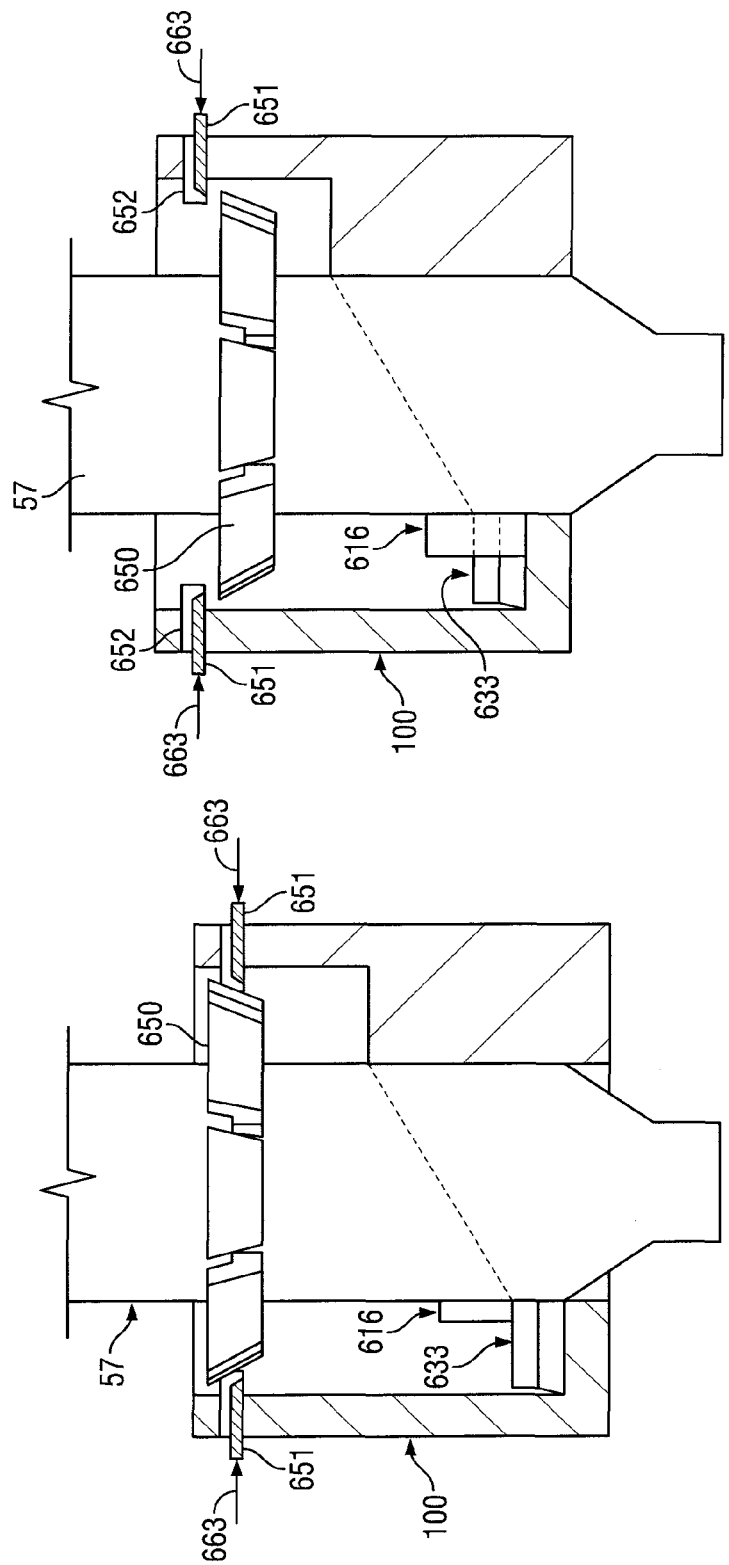

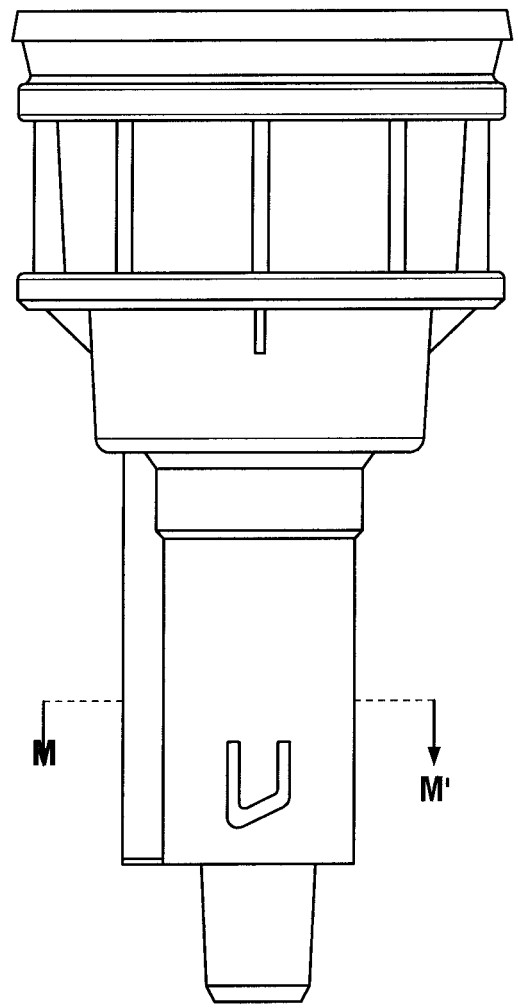
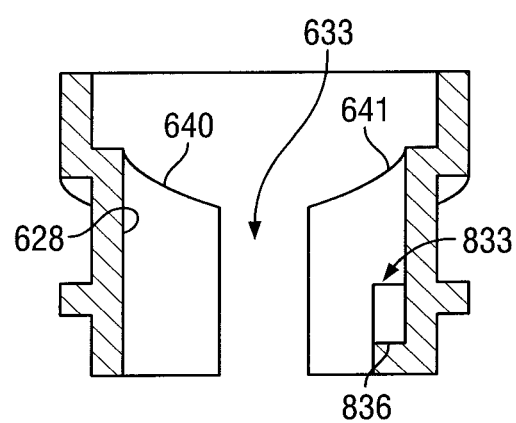
FIG. 50

ROTATING KEYED DISPENSING CARTRIDGE SYSTEM

SCOPE OF THE INVENTION

This invention relates generally to dispensers and, more particularly, to dispensers with a replaceable element, such as a pump carrying reservoir, with keying or lock out arrangement for limiting use of replaceable elements to limited configurations.

BACKGROUND OF THE INVENTION

Many dispensers of material such as fluid dispensers have removable cartridges which are inserted and removed for replacement after the material to be dispensed carried by the cartridge has been exhausted. Many such dispensers suffer the disadvantage that coupling mechanisms for coupling of the removable cartridges to the dispensers are complex and do not provide any keying or lock out arrangement for limiting use of replacement cartridges to limited configurations.

Many of today's products sold in liquid form, such as liquid hand soap, are contained in disposable containers or reservoirs which incorporate an outlet valve often in the form of a pump assembly. Typically, the pump assembly includes a reciprocally movable element which when moved dispenses a quantity of liquid soap from the reservoir. The reservoirs are generally fitted within a permanent housing which includes a movable actuator assembly which engages and reciprocally moves the movable element to dispense the fluid.

This has been found to be both a convenient and economical means of fluid supply and dispensation. Since the fluid reservoirs are replaced once the fluid supply is exhausted, it is desirable to manufacture the dispenser and reservoir so as to make replacement of the fluid reservoir as easy and quick as possible.

Known fluid dispensers suffer the disadvantage that the coupling mechanism for coupling of the movable element and the actuator assembly permits movable elements having a wide variety of physical shapes and sizes to be coupled to the actuator assembly, and thus do not provide a keying or lock out arrangement for limiting replacement reservoirs which can be coupled to the housing to those with movable elements of limited particular shapes and sizes.

SUMMARY OF THE INVENTION

To at least partially overcome these disadvantages of known dispensers, the present invention provides an improved arrangement for removably coupling a removable cartridge carrying product to be dispensed to a dispenser with the removable cartridge carrying a keying arrangement which limits the shape and size of replacement removable cartridges which can be coupled to the dispenser.

To at least partially overcome these disadvantages of known fluid dispensers, the present invention further provides an improved arrangement for removably coupling a movable element of a piston pump to an actuator mechanism by providing a keying arrangement in which the actuator mechanism limits the shape and size of the movable elements of a reservoir which can be coupled to the actuator mechanism.

In accordance with one aspect of the present invention a piston of a piston pump adapted to be selectively coaxially slidably coupled to a complementary actuator mechanism by a keying arrangement utilizing one or more key elements engaging with one or more keyways, to place the piston and actuator mechanism in rotational alignment about the axis and with keying involving complementary circumferential location of keying elements and keyways, complementary radial extents of key members and keyways relative the axis, and/or complementary shapes for the key elements and keyways normal the axis.

An object of the present invention is to provide a keying arrangement in which a catch member of the actuator mechanism limits the shape and size of the movable elements of a reservoir which can be coupled to the actuator mechanism.

In one aspect the present invention provides a dispenser for dispensing fluid comprising:
a housing,
a removable container insertable into the housing to assume a dispensing position and removable from the housing for replacement,
the container carrying a pump having a piston reciprocally slidable along an axis for dispensing fluid from the container with reciprocal axial sliding of the piston,
the piston rotatable about the axis,
a directional nozzle carried on the piston wherein the piston in desired relative rotational positions about the axis directs fluid from the nozzle over desired angular sectors and in undesired rotational position directs fluid from the nozzle over undesired angular sectors,
cam surfaces carried on the piston,
camming surfaces carried on the housing, wherein on insertion of the container carrying the pump and its piston into the housing, the cam surfaces and camming surfaces engage to rotate the piston about the axis from undesired rotational positions to desired rotational positions.

In another aspect, the present invention provides a dispenser for dispensing fluid comprising:
a housing,
a removable reservoir insertable into the housing to assume a dispensing position and removable from the housing for replacement,
the reservoir comprising:
(i) a chamber for retaining fluid having an outlet, and
(ii) a valve mechanism disposed across the outlet for dispensing fluid from chamber,
the valve mechanism comprising, a reciprocally movable element for reciprocal movement along an axis relative to the housing when the reservoir is in the dispensing position to dispense fluid,
an actuator on the housing for engaging the element to reciprocally axially slide the piston element,
the element rotatable about axis relative the actuator,
a lock out key carried on the element,
a keyway carried on the actuator,
wherein with the element coaxially aligned with the actuator (a) with the element in a desired relative rotational position about the axis relative the actuator with axial sliding of the element relative the actuator, the key is received in the keyway and the actuator couples with the element for reciprocal movement to dispense of fluid and (b) with the element in undesired rotational positions different than the desired rotational position relative the actuator the key is not in the keyway and blocks coupling of the actuator and the element,
a cam surface carried on the element,
a camming surface carried on the actuator,
wherein with the element coaxially aligned with the actuator with axial sliding of the element relative the actuator the cam surface and camming surface engage to rotate the element about the axis from the undesired rotational positions to the desired rotational position.

A dispenser for dispensing fluid comprising:
a housing, a removable container insertable into the housing to assume a dispensing position and removable from the housing for replacement, the container carrying a pump having a piston element reciprocally slidable along an axis for dispensing fluid from the container with reciprocal axial sliding of the piston element, an actuator on the housing for engaging the piston element to reciprocally axially slide the piston element, the piston element rotatable relative the actuator about the axis, a lock out key carried on the piston element, a keyway carried on the actuator, wherein with the piston element coaxially aligned with the actuator (a) with the piston element in a desired relative rotational position about the axis relative the actuator with axial sliding of the piston element relative the actuator, key is received in the keyway and the actuator couples with the piston element for reciprocal movement to dispense of fluid and (b) with the piston element in undesired rotational positions different than the desired rotational position relative the actuator the key is not in the keyway and blocks coupling of the actuator and the piston element, an axially directed cam surface carried on the piston element, an axially directed camming surface carried on the actuator, wherein with the piston element coaxially aligned with the actuator with axial sliding of the piston element relative the actuator the cam surface and camming surface engage to rotate the piston element about the axis from the undesired rotational positions to the desired rotational position.

BRIEF DESCRIPTION OF THE DRAWINGS

Further objects and advantages of the invention will appear from the following description taken together with the accompanying drawings in which:

FIG. 8 is a partial cross-sectional front view of the housing and reservoir in the same position of FIG. 3 enlarged to show merely portions of the piston element and the actuator assembly with the piston element and the actuator assembly in rotational alignment;

FIG. 9 is a top view of the socket member of the actuator as seen along section line V-V' in FIG. 8;

FIG. 26 is a partial cross-sectional front view similar to FIG. 8 but of the second embodiment incorporating the piston element of the pump assembly shown in FIG. 20 and the actuator assembly of FIG. 22 with the piston element and the actuator assembly out of rotational alignment by about 90 degrees;

FIG. 27 is a partial cross-sectional front view of the housing and reservoir as in FIG. 26 with the piston element and the actuator assembly about 90 degrees out of rotational alignment and with the actuator assembly moved axially upwardly from the extended position of FIG. 26 until the actuator assembly engages the piston element;

FIG. 28 is a partial cross-sectional front view of the housing and reservoir as in FIG. 26 but with the actuator assembly moved axially upwardly from the position of FIG. 27 with the actuator assembly engaging the piston element and the piston element and the actuator assembly being about 20 degrees out of rotational alignment;

FIG. 29 is a partial cross-sectional front view of the housing and reservoir as in FIG. 22 but with the actuator assembly moved axially upwardly from the position of FIG. 28 with the actuator assembly engaging the piston element and the piston element and the actuator assembly in rotational engagement;

FIG. 50 is a schematic side view showing the piston pump of FIG. 48 in side view and the socket member of FIG. 49 in vertical cross-section along section line L-L' in FIG. 49, with each in the rotational position shown in FIG. 49;

DETAILED DESCRIPTION OF THE DRAWINGS

Figure 1:
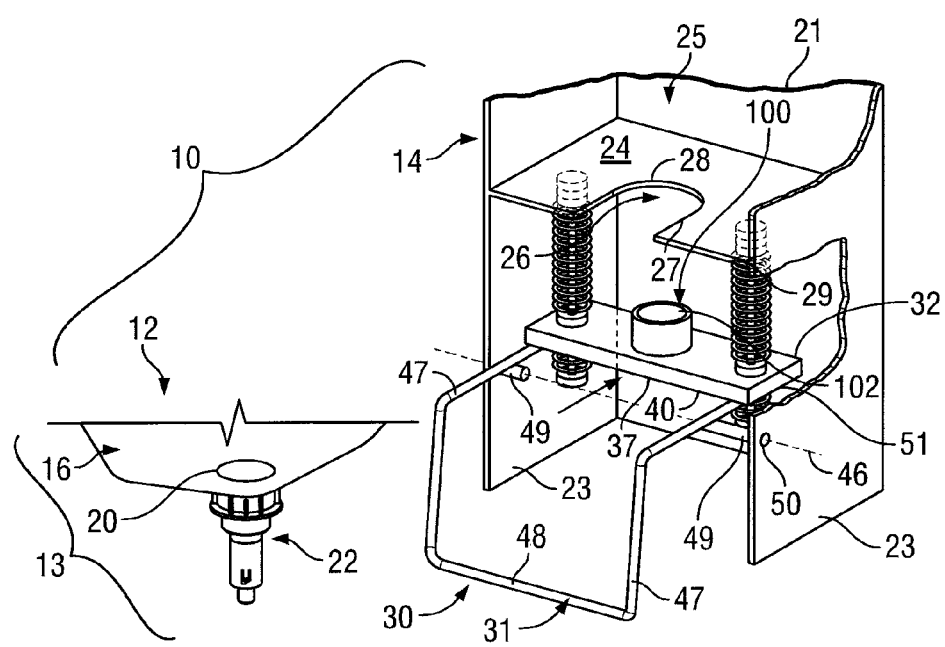
FIG. 1 is an exploded partial front perspective view of a first embodiment of a housing and reservoir of a dispenser in accordance with the invention illustrating a reservoir ready for insertion by relative horizontal movement but with the actuator assembly in a rest position.

Reference is made first to FIG. 1 which shows a dispenser 10 in accordance with a preferred embodiment of the invention. The dispenser 10 comprises a replaceable cartridge 13 and a housing 14.

Figure 3:
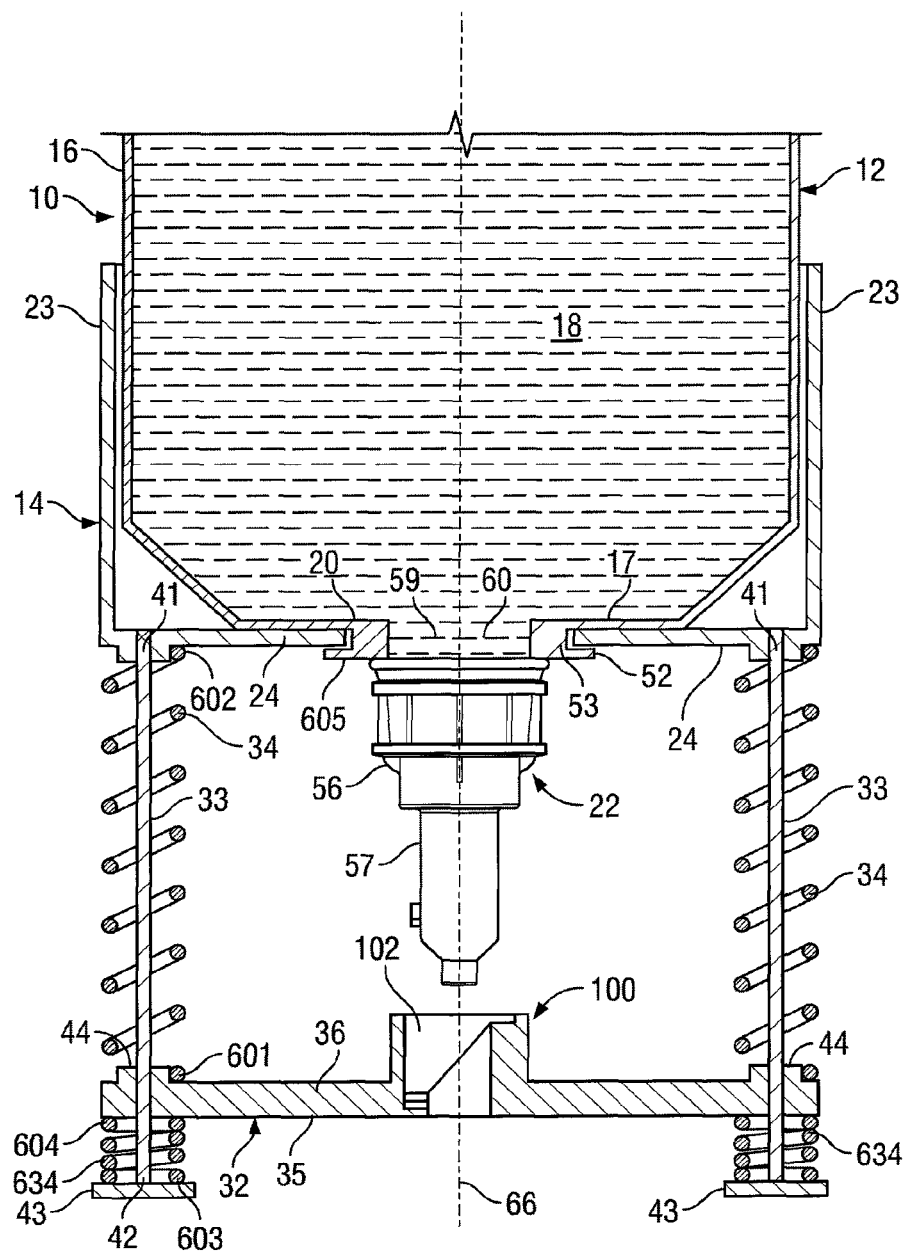
FIG. 3 is a partial cross-sectional front view of the housing and reservoir of FIG. 2 with the reservoir coupled to the housing with a reciprocally movable piston element of the reservoir in a fully extended position and with an actuator assembly of the housing in the insertion lower position as shown in FIG. 2.

The cartridge 13 includes a reservoir 12 and a reservoir valve assembly 22. The reservoir 12, as best seen in FIG. 3, comprises a chamber 16 for holding fluid 18 as, for example, liquid soap, which is to be dispensed. An outlet 20 is provided through a lowermost wall 17 of the chamber 16, across which the valve assembly 22 is located to regulate the flow of fluid 18 outwardly therethrough. Preferably, the reservoir 12 is made entirely of plastic and is disposable once the supply of fluid 18 is exhausted.

FIG. 1 shows the housing 14 in an open configuration ready for insertion of the reservoir 12. The housing 14 includes a backplate 21 typically adapted for permanent attachment to a wall. A pair of side walls 23 extend vertically forwardly from each side of the backplate 21. A support flange 24 is provided extending horizontally between the side walls 23 so as to define a cavity 25 above the flange 24 between the side walls 23 and backplate 21 to receive the reservoir 12.

The flange 24 has an opening 26 vertically therethrough in the form of a U-shaped slot 27 closed at a rear blind end 28 and open forwardly to the front edge 29 of the flange 24.

An actuator assembly 30 is provided on the housing 14, movable relative to the housing. The actuator assembly 30 includes notably a pivoting lever 31 and an actuator plate 32 mounted to the housing to be vertically slidable. Pivoting of the lever 31 moves the vertically slidable actuator plate 32 linearly on a pair of vertically extending guide rods 33.

The actuator plate 32 has a downwardly directed lower surface 35 and an upwardly directed upper surface 36, each extending normal to the linear path of movement of the actuator plate 32. Two upper springs 34 are provided, each disposed about one the guide rods 33 above the actuator plate 32. Two lower springs 634 are provided, each disposed about one of the guide rods 33 below the actuator plate 32.

The actuator plate 32 carries a socket member 100 with a socket cavity 102 opening upwardly from the actuator plate 32.

The two parallel spaced locating rods 33 are fixedly secured at their upper ends 41 to flange 24 and extend downwardly to their lower ends 42 to which respective retaining ferrules 43 are secured. The actuator plate 32 has a pair of cylindrical bores 44 through which the rods 33 pass. The actuator plate 32 is disposed on the rods 33 above the ferrules 43.

The upper springs 34 each have a lower end 601 which engages the upper surface 36 of the actuator plate 32 and an upper end 602 which engages the housing flange 24 to resiliently bias the actuator plate 32 downwardly away from the flange 24.

Figure 4:
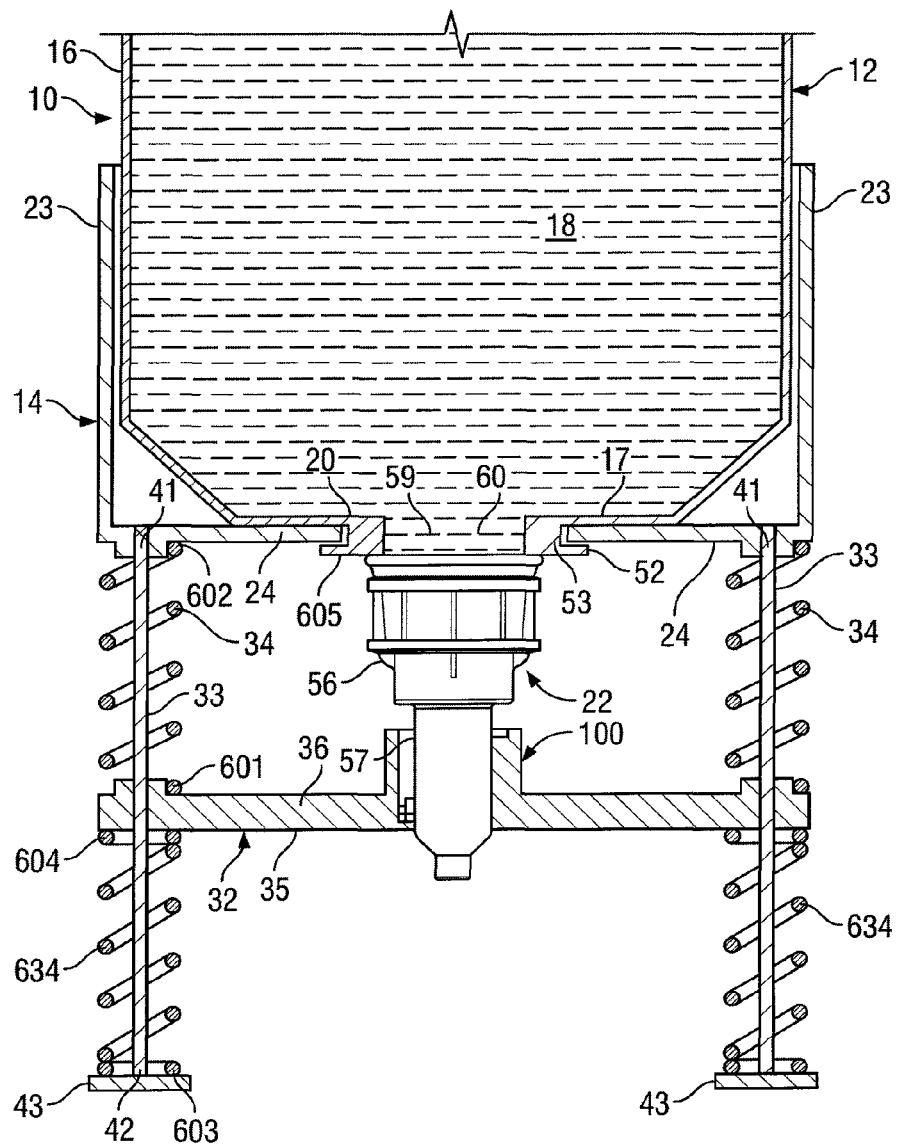
FIG. 4 is a partial cross-sectional front view of the housing and reservoir of FIG. 1 in a coupled orientation with an actuator assembly of the housing in the rest position and a reciprocally movable piston element of the reservoir in a fully extended position as in FIG. 1.

The lower springs 634 each have a lower end 603 which engages the ferrules 43 and an upper end 604 which engages the lower surface 35 of actuator plate 32 to resiliently bias the actuator plate 32 upwardly away from the ferrules 43 toward a rest position shown in FIGS. 1 and 4.

The actuator assembly 30 includes the lever 31 which is pivotally connected to the housing 14 for pivoting about a horizontal axis 46. The lever 30 is U-shaped having a pair of side arms 47 connected at their front by a horizontal connecting bight 48. A pair of horizontal stub axles 49 extend laterally outwardly from the side arms 47 and are received in holes 50 through the side walls 23 to journal the lever 31 to the housing for pivoting about the axis 46.

A rear end of each side arm 47 of the lever 31 is coupled to the lower surface 35 of the actuator plate 32. Manual urging of the bight 48 of the lever 31 rearwardly or downwardly by a user moves the actuator plate 32 upwardly against the bias of the upper springs 34. Manual urging of the bight 48 of the lever 31 forwardly or upwardly by a user moves the actuator plate 32 downwardly.

Figure 2:
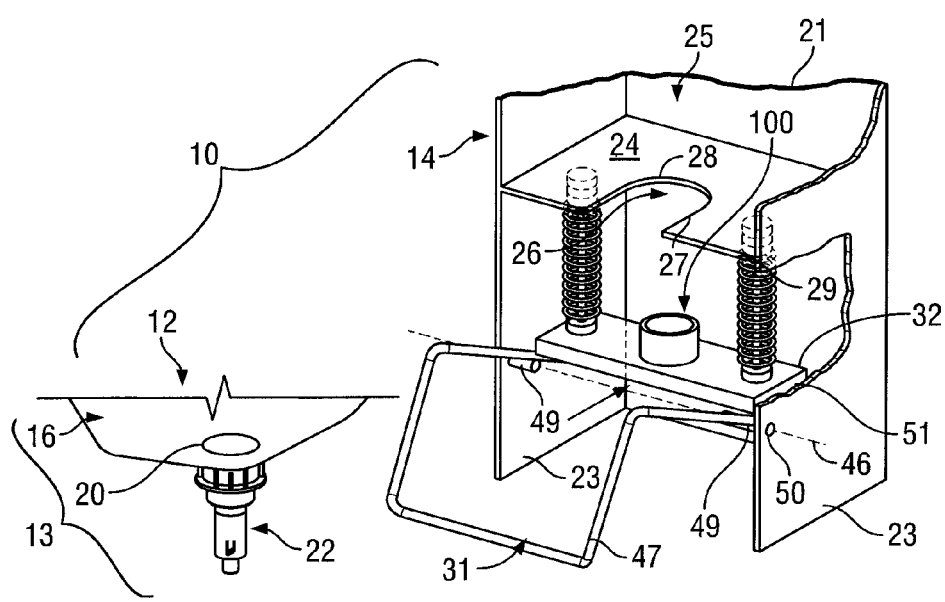
FIG. 2 is an exploded partial front perspective view the same as FIG. 1 but with the actuator assembly in an insertion lower position.

From a rest position as seen in FIGS. 1 and 4, manual movement of the bight 48 of the lever forwardly or upwardly by a user moves the actuator plate 32 downwardly against the bias of the lower springs 634 from the rest position shown in FIGS. 1 and 4 to an insertion lower position shown in FIGS. 2 and 3. With the actuator plate 32 in the lower position of FIG. 3 or between the lower position and the rest position, on release of the lever 31 by a user, the force of the lower springs 634 returns the actuator plate 32 to the rest position of FIG. 4.

Figure 5:
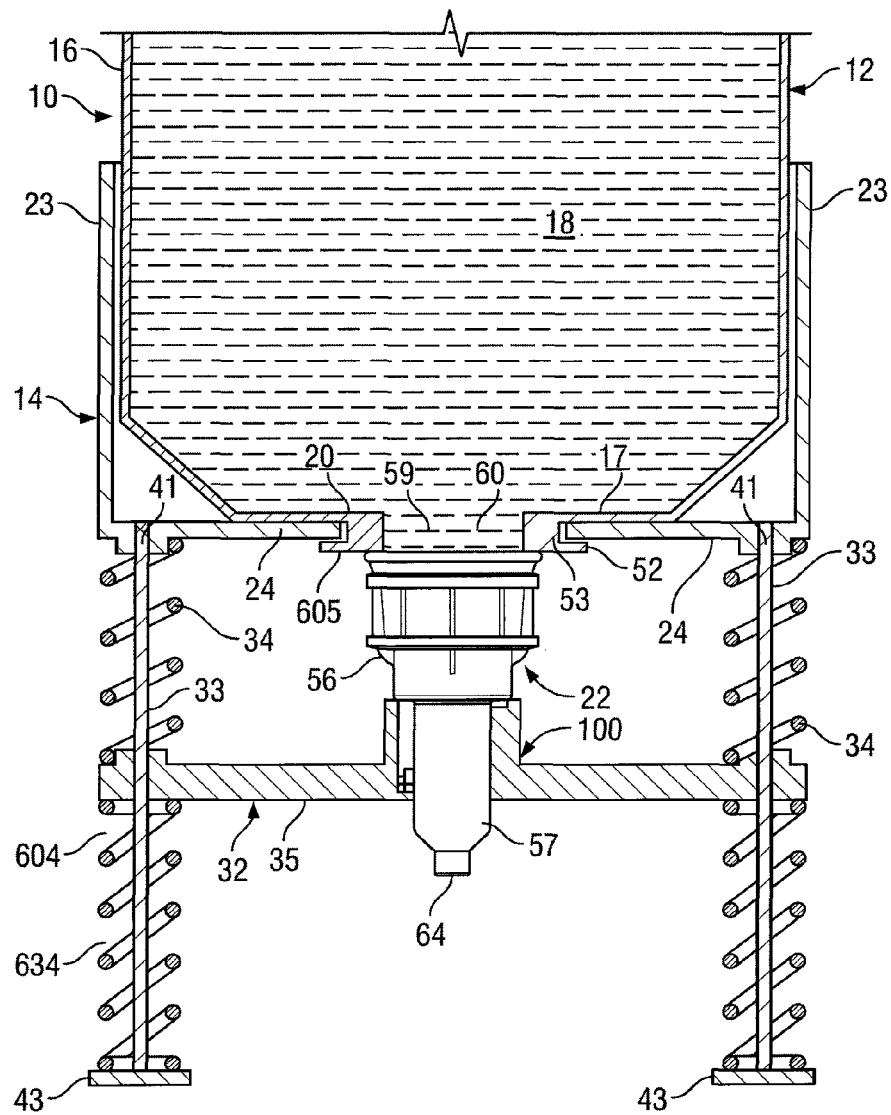
FIG. 5 is a partial cross-sectional front view of the housing and reservoir of FIG. 1 in a coupled orientation the same as in FIG. 4 but with the actuator assembly moved upwardly from the rest position of FIG. 4 to a retracted position and the piston element fully retracted.

From a rest position as seen in FIGS. 1 and 4, manual urging of the bight 48 of the lever 31 rearwardly or downwardly by a user moves the actuator plate 32 upwardly against the bias of the upper springs 34 from the rest position shown in FIGS. 1 and 4 to elevated positions above the rest position including, for example, an elevated position as shown in FIG. 5 in which a piston element 57 of the reservoir valve assembly 22 is in a coupled orientation with the socket member 100 of the actuator plate 32.

As can be seen in FIG. 5, the lower springs 634 in an unbiased condition have their upper ends 604 disposed substantially at a position which would engage the actuator plate 32 in the rest position and, in this preferred embodiment, the lower springs 634 effectively serve as a stop to prevent the actuator plate 32 from moving downwardly under the influence of the upper springs 34 past the rest position. This can be accomplished by providing the lower springs 634 to have a significantly greater strength than the upper springs 34. In an alternate configuration, after insertion of the cartridge 13, and in closing the housing 14 as with a cover (not shown) hinged to the housing 14, a stopping mechanism can be provided to prevent the actuator plate 32 from moving downwardly beyond the rest position until the cover may be opened.

In the present embodiment, unless the lever 31 is manually moved rearwardly or downwardly from the rest position, the actuator plate 32 is effectively constrained in its movement upwardly from the rest position against the bias of the upper springs 34 which when the lever 31 is released by a user will return the actuator plate 32 to the rest position.

In use of the dispenser 10 to dispense fluid, with the piston element 57 engaged with the actuator plate 32 in a coupled orientation as shown in each of FIGS. 4 and 5, from the rest position shown in FIG. 4, a user moves the lever 31 rearwardly to move the actuator plate 32 from the rest position of FIG. 4 to the elevated position of FIG. 5 and subsequently releases the lever 31 such that the actuator plate 32 returns under the influence of the upper springs 34 to the rest position shown in FIG. 4. In the cycle of operation between the rest position of FIG. 4 and the elevated position of FIG. 5 with the piston element 57 engaged with the actuator plate 32 in a coupled orientation, fluid is dispensed from the dispenser out the outermost end 64 of the piston element 57.

The opening 26 of the flange 24 is positioned to permit the reservoir 12 to be slid rearwardly into the housing 14, in the manner illustrated in FIG. 2. The flange 24 is located such that when the reservoir 12 is slid horizontally into the housing 14, the flange 24 abuts and supports the lowermost wall 17 of the fluid chamber 16 to assist in maintaining the reservoir 12 in a fluid dispensing position. The flange 24 is received in a slotway 52 between the lowermost wall 17 of the fluid chamber 16 and an upwardly directed shoulder 53 about a neck 605 on the reservoir 12, thereby preventing axial sliding movement of the reservoir 12 as the dispenser 10 is used. The U-shape of the opening 26 of the flange 24 assists in guiding the reservoir 12 as it is inserted into and removed horizontally from the housing 14. Rather than provide the slotway 52 merely on the reservoir 12, it may be provided merely on the valve assembly 22 or between the reservoir 12 and the valve assembly.

Figure 6:
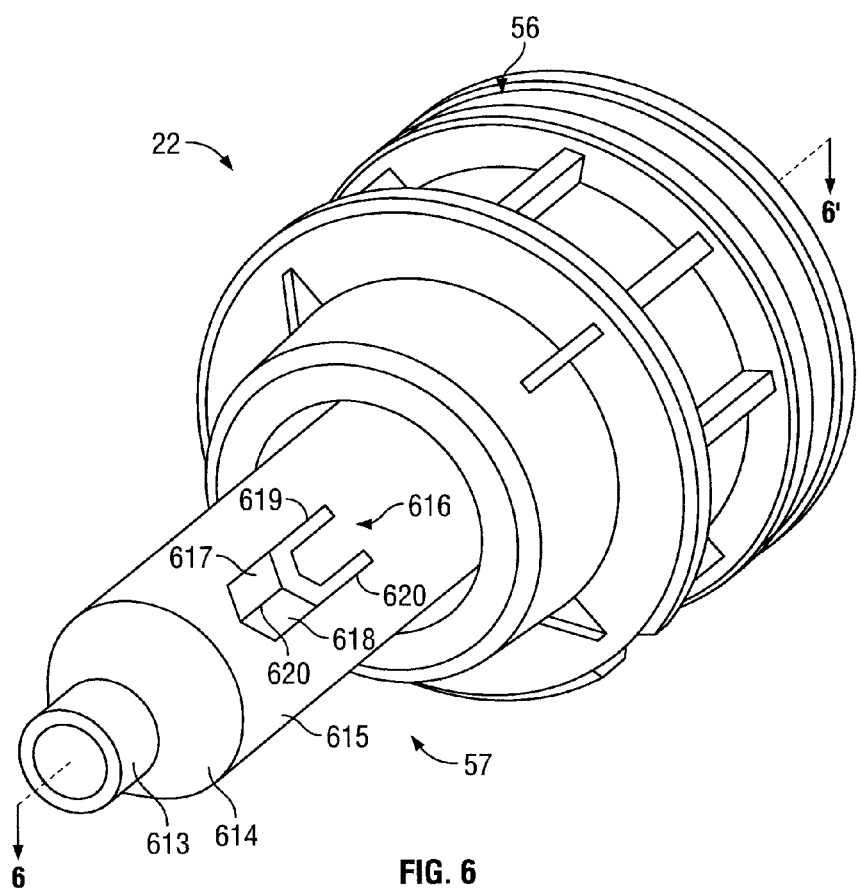
FIG. 6 is a pictorial view of the piston pump shown in FIG. 1.

Reference is made to FIG. 6 which shows a pictorial view of the reservoir valve assembly 22 shown in FIGS. 1 to 5.

Figure 7:
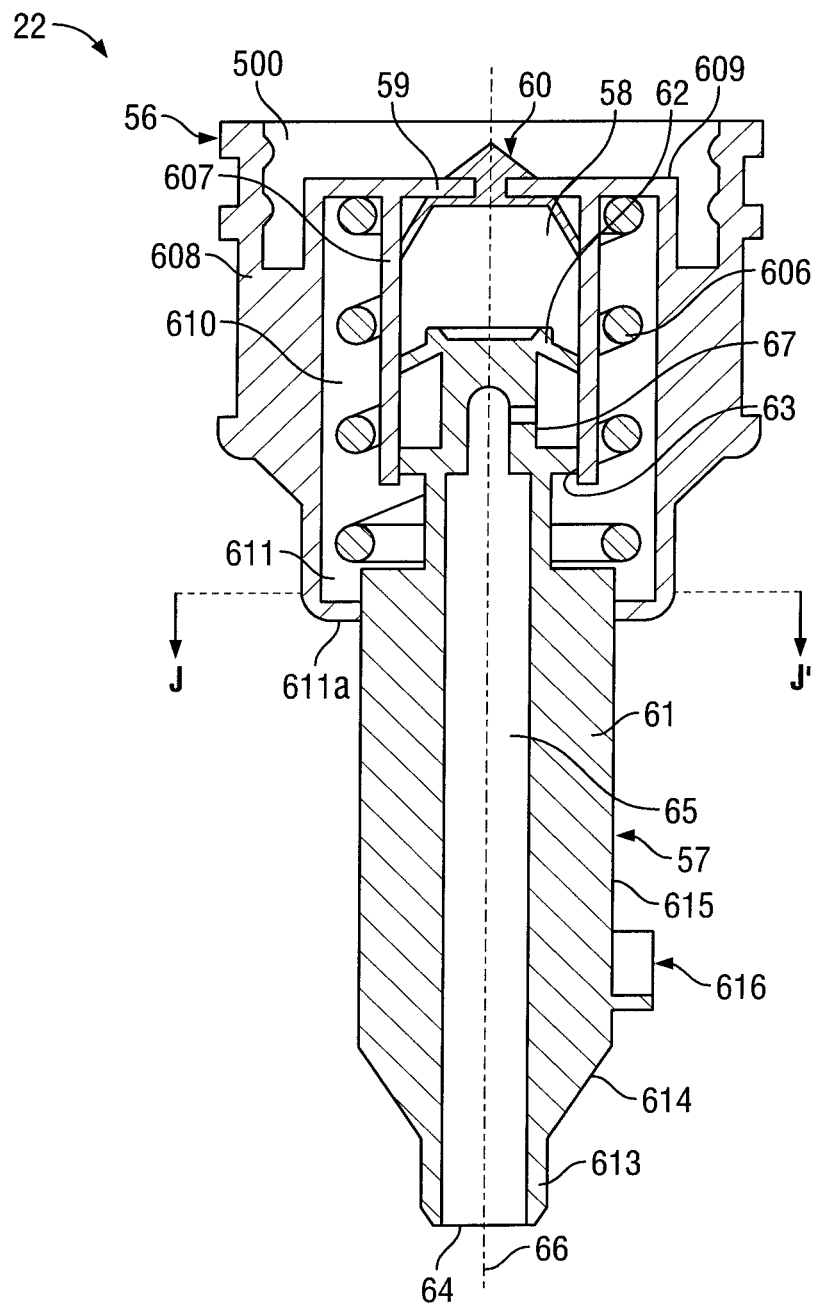
FIG. 7 is an axial cross-sectional view of the pump assembly shown in FIG. 6 along section lines 6-6'.

FIG. 7 best shows the reservoir valve assembly 22 in cross-section as comprising a piston pump of the type described in U.S. Pat. No. 5,165,577 to Ophardt issued Nov. 24, 1992, the disclosure of which is incorporated herein by reference, but also including an internal return spring 606. The valve assembly 22 includes a piston chamber-forming member 56 and a piston element 57. The piston chamber forming member 56 forms a dispensing chamber 58 having at an inwardmost end an inlet opening 59 opening into the chamber 16. A one-way inlet valve 60 is provided across the inlet opening 59 which permits fluid 18 to flow outwardly from the chamber 16 into the dispensing chamber 58 but prevents flow from the dispensing chamber 58 to the chamber 16. The reciprocally movable piston element 57 is coaxially slidably received within the dispensing chamber 58 for reciprocal relative sliding about an axis 66. The piston element 57 has an axially extending hollow stem 61 which carries a flexible inner flange 62 and an outer sealing flange 63 to engage the inner wall of the dispensing chamber 58 in a manner that reciprocal movement of the piston element 57 axially along the axis 66 in the dispensing chamber 58 causes fluid 18 to flow from the chamber 58 outwardly past the one-way valve 60 and out an outermost end 64 of the piston element 57 via an internal passageway 65 through the stem 61.

The internal passageway 65 through the stem 61 extends inwardly to a radial opening 67 through the stem 61 into the dispensing chamber 58 between the inner flange 62 and the outer sealing flange 63.

The piston chamber-forming member 56 includes an inner tubular member 607 and an outer tubular member 608 each effectively closed at their inner ends by a radially extending end flange 609 through which the inlet opening 59 to the dispensing chamber 58 extends. As seen in FIG. 7, the outer tubular member 608 carries an axially outwardly extending annular slot 500 with threads on its radially outer surface to sealably engage with threads (not shown) carried on the neck 605 of the reservoir 16. The dispensing chamber 58 is defined coaxially within the inner tubular member 607 and opens outwardly. An annular cavity 610 is provided between the inner tubular member 607 and the outer tubular member 608 within which the internal return spring 606 is coaxially disposed. An inner end of the internal return spring 606 engages the end flange 609 and an outer end of the internal return spring 606 engages an axially inwardly directed surface of a stopping flange 611 carried on the piston element 57. The outer tubular member 608 carries at its outer end a radially inwardly extending annular stop flange 611a having an axially inwardly directed surface in opposition to an axially outwardly directed surface on the stopping flange 611. Engagement between the stopping flange 611 on the piston element 57 and the stop flange 611a on the piston chamber-forming member 56 limits axially outward sliding of the piston element 57 in an extended position as seen in FIGS. 6 and 7. The piston element 56 may be slid coaxially relative to the piston chamber-forming member 56 from the extended position shown in FIG. 7 to a retracted position by relative movement of the piston element 57 axially inwardly against the bias of the internal return spring 606. The internal return spring 606 biases the piston element 57 axially outwardly towards the extended position shown in FIG. 7.

The piston element 57 has a forward portion 612 which is forward of the stopping flange 611 and which forward portion 612 extends outwardly from the piston chamber-forming member 56. The forward portion 612 in the preferred embodiment includes a cylindrical nose segment 613, a frustoconical camming segment 614 and a cylindrical guide segment 615. The guide segment 615 carries a key member 616 which extends radially outwardly from the guide segment 615. As can be best seen in FIGS. 6 and 7, the key member 616 is symmetrical about cross-sectional plane 6-6' in FIG. 6 which plane extends radially through the axis 66. The key member 616 has axially outwardly directed front camming surfaces 617 and 618 and two parallel circumferentially directed outer side surfaces 619 and 620. The front camming surfaces are each and disposed to angle forwardly from where they merge with the side surfaces 619 or 620 axially to a central head apex 620.

As can be seen, for example in FIG. 1, the actuator plate 32 carries the socket member 100 which defines an upwardly opening cavity 102 therein.

As seen in FIGS. 4 and 5, the piston element 57 is engaged with the actuator plate 32 in a coupled orientation.

With the piston element 57 engaged with the actuator plate 32 in the coupled orientation as seen in FIG. 4, reciprocal movement of the actuator plate 32 between the extended position and the retracted position results in corresponding movement of the piston element 57 to dispense fluid from the reservoir.

Reference is made to FIG. 8 showing in an enlarged schematic cross-sectional view of selected portions of the piston element 57 and the actuator plate 32. In FIG. 8, for convenience of illustration, merely portions of the piston element 57 and the actuator plate 32 are shown. In FIG. 8, merely a central portion of the actuator plate 32 is shown which carries the socket member 100. Similarly, in FIG. 8, the piston element 57 is shown as merely as a truncated hollow stem 61 carrying the forward portion 612. Each of FIGS. 10, 13, 14, 16 and 18 are similar to FIG. 8 in only showing the truncated hollow stem 61 of the piston element 57 and the central portion of the actuator plate 32 as in FIG. 8.

The socket member 100 serves to define the cavity 102 therein which is adapted to receive the forward portion 612 of the piston element 57. The cavity 102 of the socket member 100 is provided to have a shape having correspondence to the shape of the forward portion 612 of the piston element 57 to be received therein. The cavity 102 extends through the actuator plate 32 about the axis 66.

Figure 10:
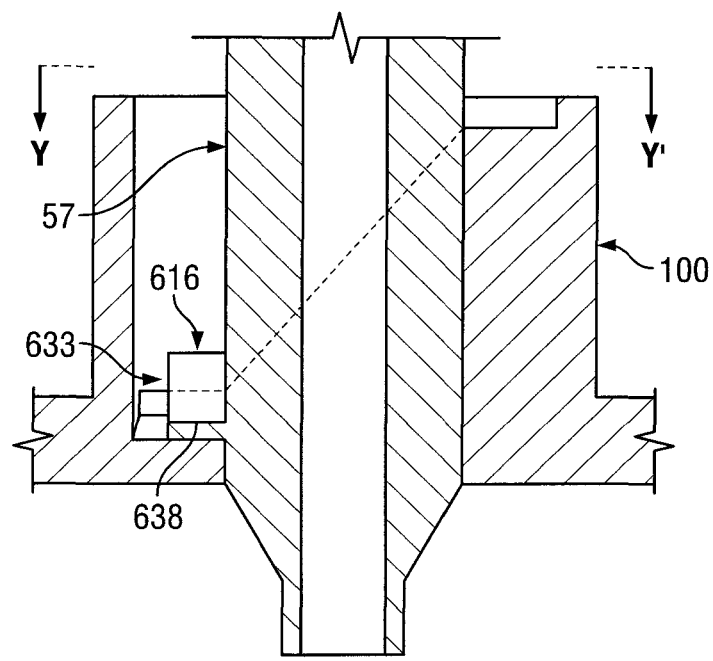
FIG. 10 is a partial cross-sectional front view of the housing and reservoir as in FIG. 8 but in the same relative position as in FIGS. 4 and 5 with the piston element and the actuator assembly in rotational alignment.

Reference is made to FIGS. 8 to 12 towards describing the features of the socket member 100 and its cavity 102. On the cross-sectional top view of FIG. 9, a vertical cross-sectional line W-W' is shown which extends parallel to the axis 66. The socket member 100 and its cavity 102 are symmetrical about this cross-sectional plane W-W' and for certainty it is stated that each of FIGS. 8 and 10 represent a cross-sectional about a section line the same as W-W' shown in FIG. 9.

The socket member 100 comprises an annular tubular member with an annular wall 622 having an axially inner end 623 and an axially outer end 624. The outer end 624 is shown coincident with the lower surface 35 of the actuator member 32. The cavity 102 is defined radially inwardly of the annular wall 622 and extending from an inner opening 625 to an outer opening 626. The outer opening 626 is circular and forms the outer end of a cylindrical bore 627 defined within a cylindrical guide wall portion 628 of the annular wall 622 which guide wall portion 628 extends 360 degrees circumferentially and coaxially about the central axis 66.

The inner opening 625 is also circular and coaxial of the center axis 66 and is defined by a cylindrical entry wall portion 629 which extends downwardly and outwardly into the cavity 102 from the inner opening 625.

The entry wall portion 629 has a diameter larger than the diameter of the guide wall portion 628. A shoulder 630 extends radially inwardly from the entry wall portion 629 to the guide wall portion 628 joining the entry wall portion 629 to the guide wall portion 628.

As best seen in FIG. 9, the shoulder 630 includes a cam forming portion and a keyway forming portion.

The keyway forming portion, as best seen in FIGS. 8 and 9, defines in the shoulder 630 between the guide wall portion 628 and the entry wall portion 629 a keyway 633. The keyway 633 has a pair of parallel side surfaces 634 and 635, each of which extend outwardly to merge into a pair of forward cam surfaces 636 and 637 disposed at an angle to extend axially outwardly to merge at a valley apex 638. As can best be seen in FIG. 12, the keyway 633 is of a complementary shape and size to the key member 616 carried on the piston element 57.

The cam forming portion of the shoulder 630 is formed by a pair of cam ramps 640 and 641 which merge together at an upper ramp apex 642. The cam ramp 640 extends from an axially inwardly directed end at the ramp apex 642 circumferentially downwardly to an axially outermost end 644 where the cam ramp 640 merges into the keyway 633 at a juncture with the side surface 634 of the keyway 633. Similarly, the cam ramp 641 extends from an axially innermost end at the ramp apex 642 circumferentially and downwardly to an axially uppermost outer end 645 where the cam ramp 641 ends at the keyway 633 with the cam ramp 641 merging with the side surface 635 of the keyway 633.

In the embodiment shown, each of the cam ramps 640 and 641 thus provides part of the cam forming portion of the shoulder 630 which extends circumferentially and downwardly to the keyway 633. In the preferred embodiment shown, the cam ramp 640 is formed by a cam surface 646 which is disposed to being perpendicular to the axis 66 and similarly, the cam ramp 641 is shown to have a cam surface 647 which is disposed to be perpendicular to the axis 66.

Referring to FIGS. 6 and 7, the piston element 57 is coupled to the piston chamber-forming member 56 in a manner that the piston element 57 is rotatable relative to the piston chamber-forming member 56 about the axis 66. In the preferred embodiment, the socket member 100 is secured to the actuator member 32 against rotation about the axis 66. In other embodiments, either one or more of the piston element 57 and the socket member 100 may be provided to be relatively rotatable about the axis 66. For example, the socket member 100 could be carried on the actuator plate 32 as a separate member journalled for rotation relative to the actuator plate 32 about the axis 66, in which case the piston element 57 does not need to rotate relative the piston chamber-forming member 56.

When the socket member 100 and the piston element 57 are coaxially aligned about the axis 66, the socket member 100 and the piston element 57 can be either in rotational alignment with each other or out of rotational alignment with each other. FIGS. 3 to 5 and 8 to 12 illustrate conditions in which the piston element 57 and the socket member 100 are in rotational alignment. When in rotational alignment, the key member 616 is at the same position circumferentially about the axis as the keyway 633 as, for example, seen in FIGS. 10 to 12 with each of the head apex 620 of the key member 616 and the valley apex 638 of the keyway 633 lying in the radially extending plane W-W' of FIG. 9 including the axis 66.

When the piston element 57 and the socket member 100 are in rotational alignment, the key member can slide axially into the keyway 633 and assume what has been referred to herein as a coupled orientation. Preferably, in accordance with the preferred embodiment of the present invention, the piston element 57 and the socket member 100 must be in the coupled orientation for proper operation of the dispenser.

Reference is made to FIG. 1 which illustrates the replaceable cartridge 13 ready for coupling to the housing 14, however, with the actuator assembly 30 in a rest position to which it is inherently biased by the upper springs 34 and the lower springs 634. From the position of FIG. 1, a user moves the lever 31 upwardly and forwardly to the position shown in FIG. 2 and in so doing, moves the actuator plate 32 downwardly from the rest position shown in FIG. 1 to the lower position shown in FIG. 2. With the housing 14 and the actuator assembly 30 in the position as shown in FIG. 2, horizontal rearward sliding of the cartridge 13 results in the flange 24 of the housing 14 being received in the slotway 52 to couple the cartridge 13 to the flange 29. As seen in FIG. 3, with the actuator plate 32 in the lower position, the actuator plate 32 and its socket member 100 are below the piston element 57 and do not impede the rearward sliding of the cartridge 13 into a coupled engagement with the flange 24. Upon insertion of the cartridge 13 to engage on the flange 24 of the housing 14, as seen in FIG. 3, the piston element 57 is placed into coaxial alignment with socket member 100 about the axis 66. On coupling of the cartridge 13 to the flange 24 as illustrated in FIG. 3, the piston element 57 can either be in rotational alignment with the socket member 100 or out of rotational alignment with the socket member 100. FIGS. 8 to 12 illustrate a subsequent operation of the dispenser 10 when the cartridge 13 is coupled to the flange 24 with the piston element 56 and the socket member 100 in rotational alignment as is also illustrated in FIGS. 3, 4 and 5.

From the position illustrated in FIG. 3 and in FIG. 8, on release of the lever 31, the actuator plate 32 is moved upwardly under the bias of the lower springs 634 to the rest position as seen in FIGS. 4 and 10 in which the guide segment 615 of the forward portion 612 of the piston element 57 coaxially slides to be closely received inside the cylindrical guide wall portion 628 of the bore 627 and with the key member 616 to slide axially into the keyway 633 such that the head apex 620 of the key member 616 engages the valley apex 638 of the keyway 633. In this position as illustrated in FIG. 10 as well as in FIGS. 4 and 5, the piston element 57 is in a coupled orientation with the actuator plate 32 and its socket member 100. The dispenser 10 is now ready for dispensing fluid in a normal cycle of operation with a user moving the lever 31 downwardly to move the actuator 32 upwardly against the bias of the springs 34 moving the piston element 57 upwardly against the bias of the internal return spring 606 and moving the actuator plate 32 and the piston element 57 in the coupled orientation from the extended position of FIG. 4 to the retracted position of FIG. 5. From the retracted position of FIG. 5, on the user releasing the lever 31, the actuator 32 is moved from the retracted position of FIG. 5 to the extended position of FIG. 4 under the bias of the upper springs 34 with the piston element 57 following the actuator plate 32 and the socket member 100 maintained in the coupled orientation by reason of the internal return springs 606 continuing to maintain an outwardly directed force urging the piston element 57 downwardly into the socket member 100 during the movement of the actuator plate 32. As is to be appreciated in such a cycle of operation, fluid from the reservoir 18 is dispensed out of an outlet in the outermost end 64 as onto a user's hands disposed below the outermost end 64.

Figure 13:
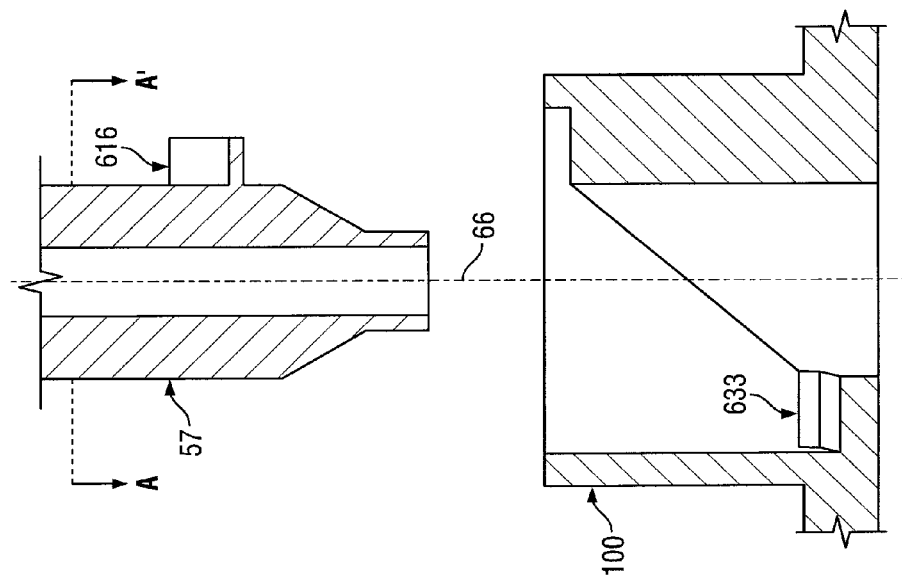
FIG. 13 is a partial cross-sectional front view of the housing and reservoir in the same position of FIG. 3 enlarged to show merely portions of the piston element and the actuator assembly as in FIG. 8 but with the piston element and the actuator assembly about 180 degrees out of rotational alignment.

Reference is made to FIGS. 13 to 19 which illustrate the operation of a dispenser 10 under a situation that the piston element 57 is inserted into a position as illustrated in FIG. 3, however, with the piston element 57 and the socket member 100 out of rotational alignment by about 180 degrees of rotation about the axis 66. FIG. 13 illustrates a condition similar to that shown in FIG. 3 and FIG. 8 in which the piston element 57 and the socket member 100 are coaxially aligned about the axis 66, however, in contrast in FIG. 13 the piston element 57 and the socket member 100 are out of rotational alignment by about 180 degrees as readily seen in top view in FIG. 15. From such a position as in FIG. 3, on release of the lever 31, the actuator plate 32 moves upwardly such that the socket member 100 moves upwardly relative to the piston element 57.

Figure 14:
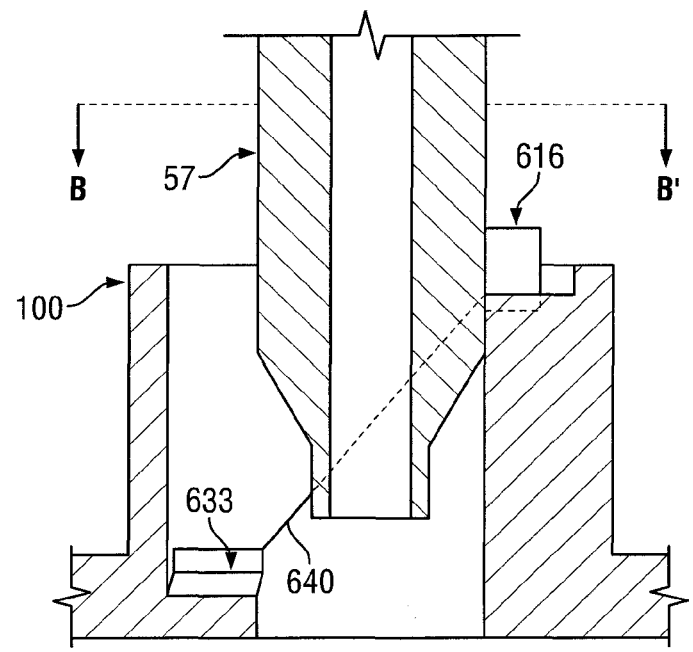
FIG. 14 is a partial cross-sectional front view of the housing and reservoir as in FIG. 13 with the piston element and the actuator assembly about 180 degrees out of rotational alignment and with the actuator assembly moved axially upwardly from the extended position of FIG. 13 until the actuator assembly engages the piston element.
Figure 15:
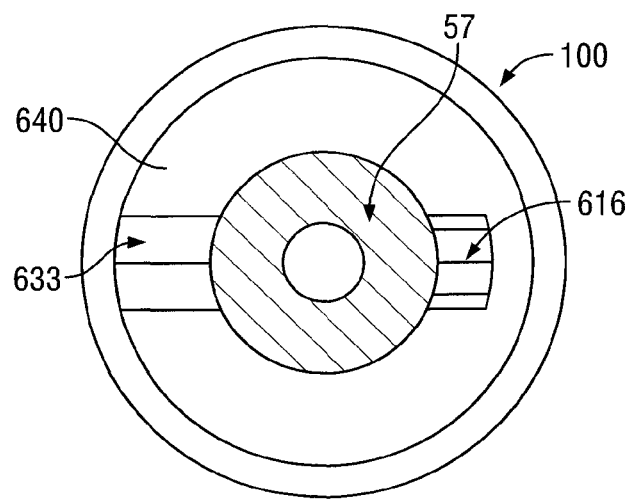
FIG. 15 is a top cross-sectional view of FIG. 13 along section line A-A' and also along section line B-B' in FIG. 14.

FIG. 14 illustrates a condition in which the socket member 100 has been moved axially from the position of FIG. 13 to a position in which the key member 616 first engages the cam ramp 640, that is, with the piston element 57 in the same relative rotational position as in FIG. 13.

From the position of FIG. 14, relative upward movement of the socket member 100 by reason of camming engagement between the key member 616 and the cam ramp 640 rotates the piston element 57 about the axis 66 such that the piston element 57 is rotated relative the socket member 100 from an initial position out of rotational alignment to a final position in rotational alignment. FIGS. 14, 16, 18 and 10 illustrate in sequence rotational positions the piston element 57 assumes.

Figure 16:
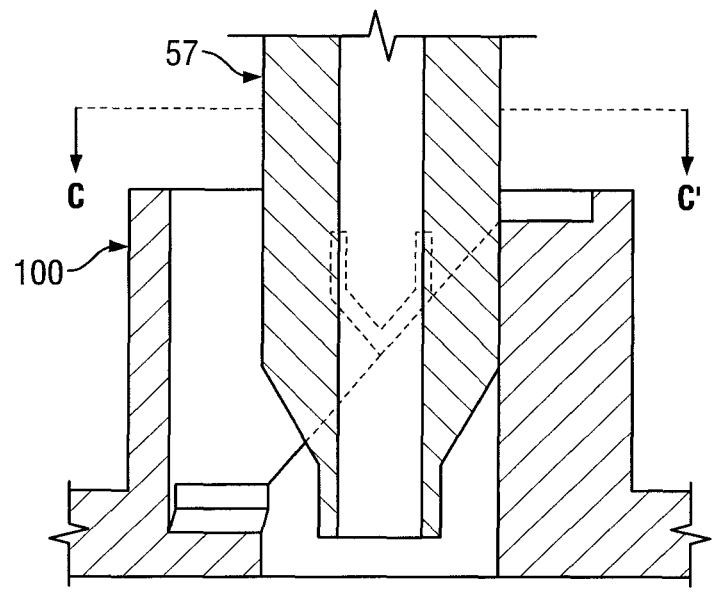
FIG. 16 is a partial cross-sectional front view of the housing and reservoir as in FIG. 13 but with the actuator assembly moved axially upwardly from the position of FIG. 14 with the actuator assembly engaging the piston element and the piston element and the actuator assembly being about 90 degrees out of rotational alignment.
Figure 17:
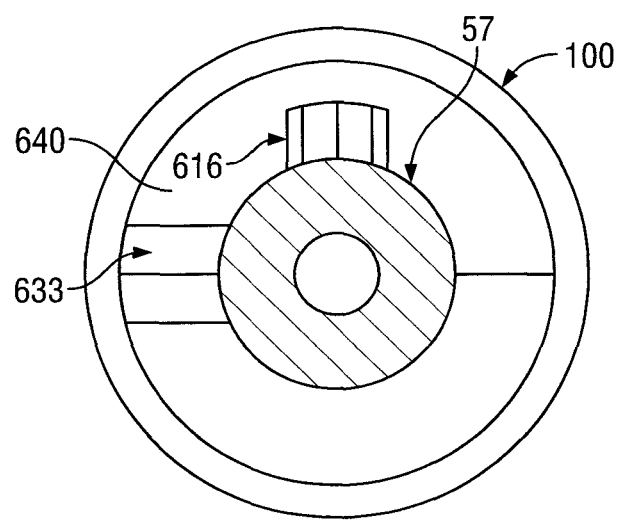
FIG. 17 is a top cross-sectional view of FIG. 16 along section line C-C'.

FIG. 16 illustrates a condition in which the socket member 100 has been moved axially inwardly relative to the piston element 57 from the position of FIG. 14 and by reason of engagement between the key member 616 and the cam ramp 640, the piston element 57 is rotated to a position in which the piston element 57 and the socket member 100 are about 90 degrees out of alignment as readily seen in top view of FIG. 17.

Figure 18:
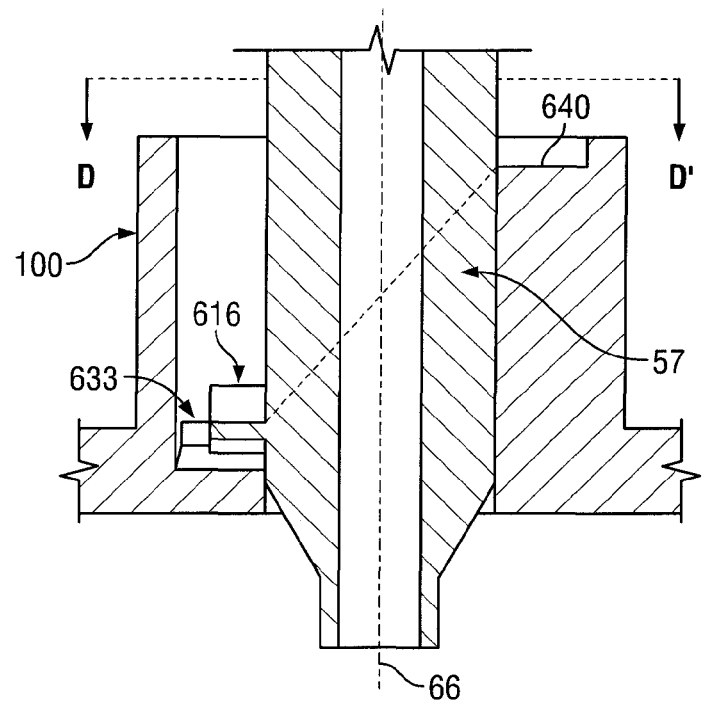
FIG. 18 is a partial cross-sectional front view of the housing and reservoir as in FIG. 13 but with the actuator assembly moved axially upwardly from the position of FIG. 16 with the actuator assembly engaging the piston element and the piston element and the actuator assembly being about 20 degrees out of rotational alignment.
Figure 19:
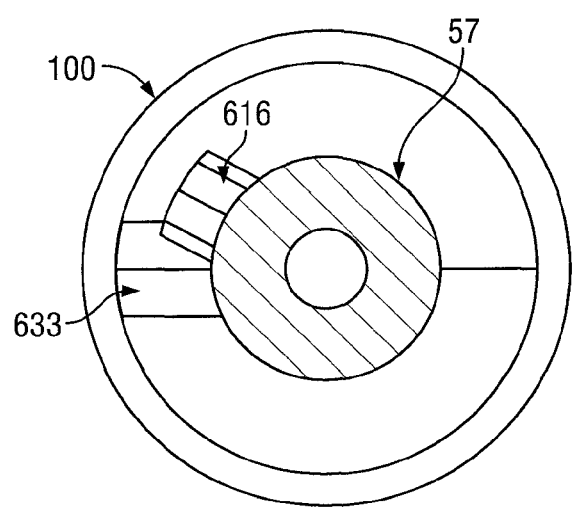
FIG. 19 is a top cross-sectional view of FIG. 18 along section line D-D'.

From the position of FIG. 16, with further axial relative inward movement of the socket member 100, engagement between the key member 616 and the cam ramp 640 relatively rotates the piston element 57 to the position shown in FIG. 18 in which the piston element 57 and the socket member 100 are out of rotational alignment by about 20 degrees as can readily be seen in top view in FIG. 19.

From the position of FIG. 18, with further relative inward axial movement of the socket member 100, the piston element 57 is rotated by reason of engagement between the key member 616 and the cam ramp 640 to a position in which the piston element 57 and the socket member 100 are in rotational alignment and from which position by further relative inward axial sliding of the socket member 100 relative to the piston element 57, the keyway member 616 can slide axially into the keyway 33 and assume a coupled orientation as illustrated in FIG. 10.

FIGS. 13 to 19 illustrate the manner in which the piston element 57 and the socket member 100 interact so as to provide relative rotation from positions out of rotational alignment toward the position of rotational alignment shown in FIG. 10. Once in the position of rotational alignment, as in FIG. 10, the operation of the dispenser is the same as that described with reference to FIGS. 4 and 5.

In accordance with the first embodiment of the dispenser utilizing a piston pump 22 including the internal return spring 606, the relative rotation of the piston element 57 and the socket member 100 from a position out of rotational alignment to the position in rotation alignment may occur merely on release of the lever 31 and movement of the actuator plate 32 from the lower position of FIG. 3 to the rest position of FIG. 4. However, if on reaching the rest position of FIG. 4, the piston element 57 and the socket member 100 may not be in rotational alignment, then in a first cycle of operation in moving the socket member 100 from the rest position of FIG. 4 to the retracted position of FIG. 5, the piston element 57 preferably will be rotated relative to the socket member 100 into rotational alignment. In the first embodiment of FIGS. 1 to 19, if, while the piston element 57 and the socket member 100 are not in rotational alignment, the lever 31 is engaged by a user to move the socket 100 to the retracted position as shown in FIG. 5, the internal return spring 606 will permit the piston element 57 to be retracted inwardly against the bias of the internal return spring 606 preventing a possible jam situation and increasing the axial forces of engagement between the key member 616 and the cam ramps 640 or 641 towards ensuring that the key member 616 is rotated to a position for rotational alignment and adoption of the coupled orientation.

Figure 20:
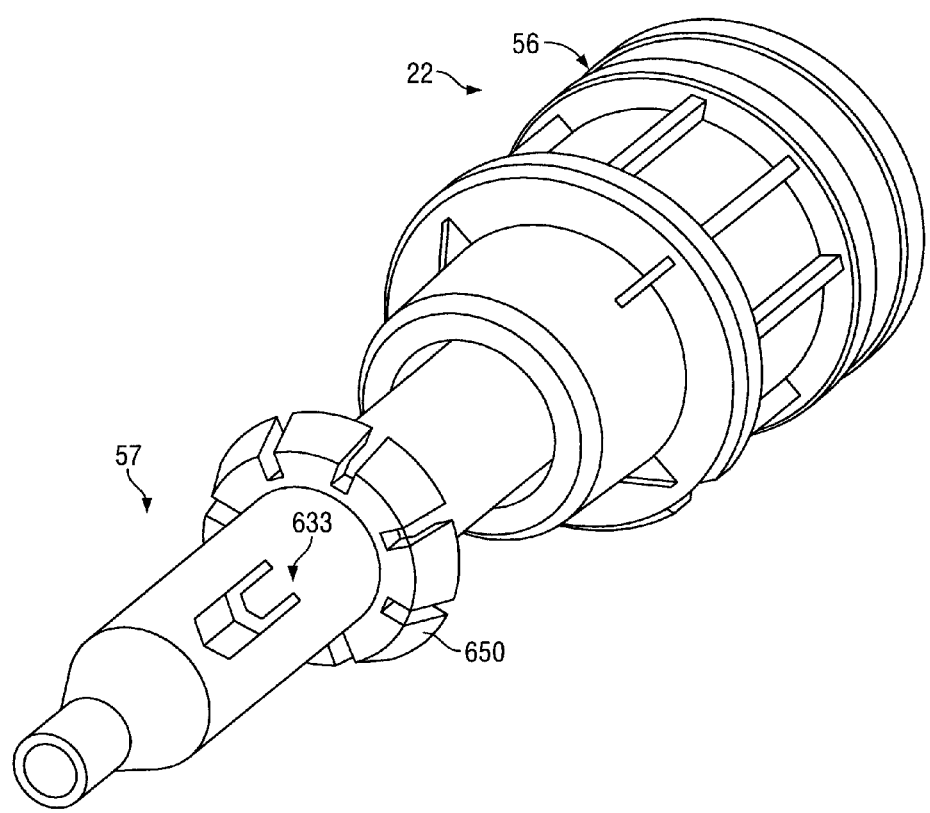
FIG. 20 is a perspective view of a second embodiment of the pump assembly similar to that shown in FIG. 6 but including an engagement flange.
Figure 21:
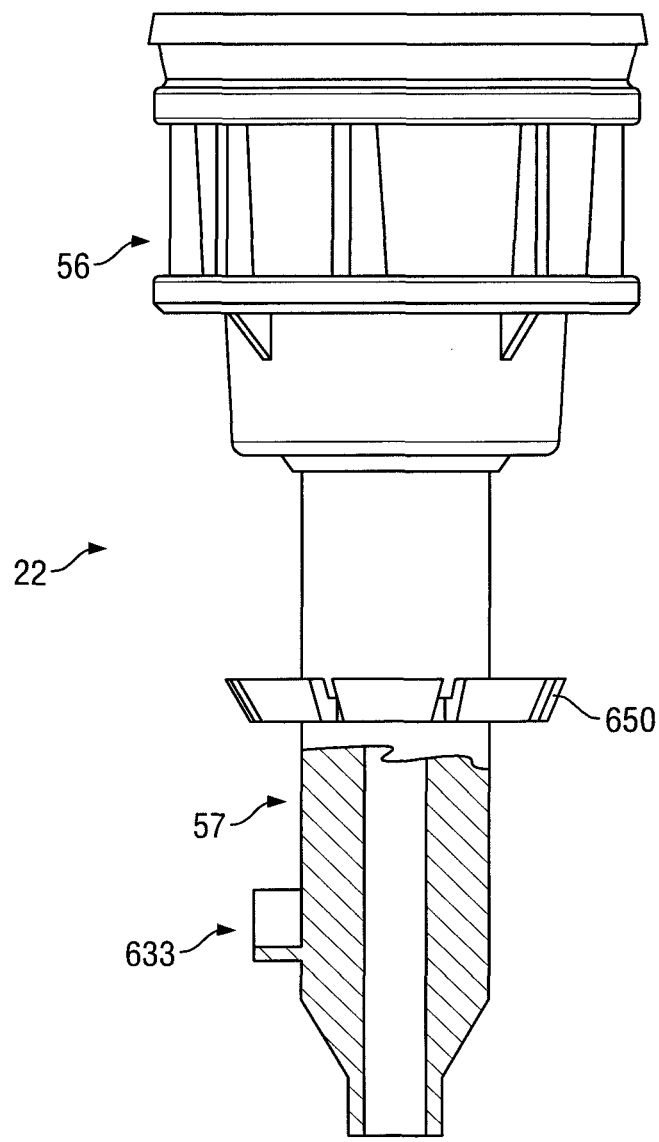
FIG. 21 is a partially cross-sectional side view of the pump assembly of FIG. 20.

Reference is made to FIGS. 20 to 29 which illustrate a second embodiment of a dispenser in accordance with the present invention which is identical to the first embodiment with the notable exception that the second embodiment of a reservoir valve assembly 22 is utilized as best illustrated in FIGS. 20 and 21 and a second embodiment of a socket member 100 is utilized as illustrated in FIGS. 22 to 29.

Reference is made to FIGS. 20 and 21 which show a second embodiment of reservoir valve assembly 22 which has substantial similarities to the first embodiment of the reservoir valve assembly 22 shown in FIGS. 6 and 7 and on which similar reference numerals are used to refer to similar elements.

The second embodiment of the reservoir valve assembly 22 shown in FIGS. 20 and 21 is identical to the first embodiment illustrated in FIGS. 6 and 7 but for the following differences: the piston element 57 has been modified to include an engagement flange 650 and the piston chamber-forming member 56 has been modified to eliminate the internal return spring 606.

Reference is made to FIGS. 22 to 25 which illustrate a second embodiment of an actuator assembly 32 for use with the second embodiment of the valve assembly 22 shown in FIGS. 20 and 21.

In FIG. 22 to 25, the socket member 100 of the second embodiment has been modified to provide radially movable latch members 651 to cooperate with the engagement flange 650 to releasably latch the piston element 57 within the socket member 100. The shoulder 630 and keyway 633 of the socket member 100 are unchanged over that illustrated in the first embodiment aside from an axial reduction of the height of the shoulder 630 and its cam ramps 640 and 641.

Figure 22:
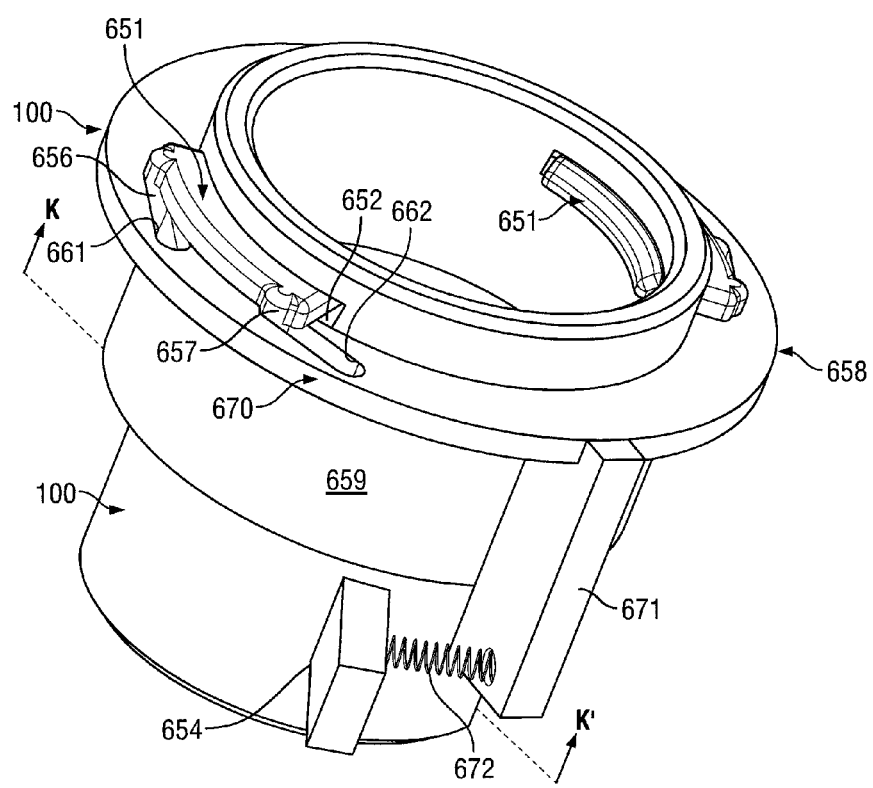
FIG. 22 is a top pictorial view of a second embodiment of the actuator assembly for use with the pump assembly shown in FIGS. 20 and 21.
Figure 23:
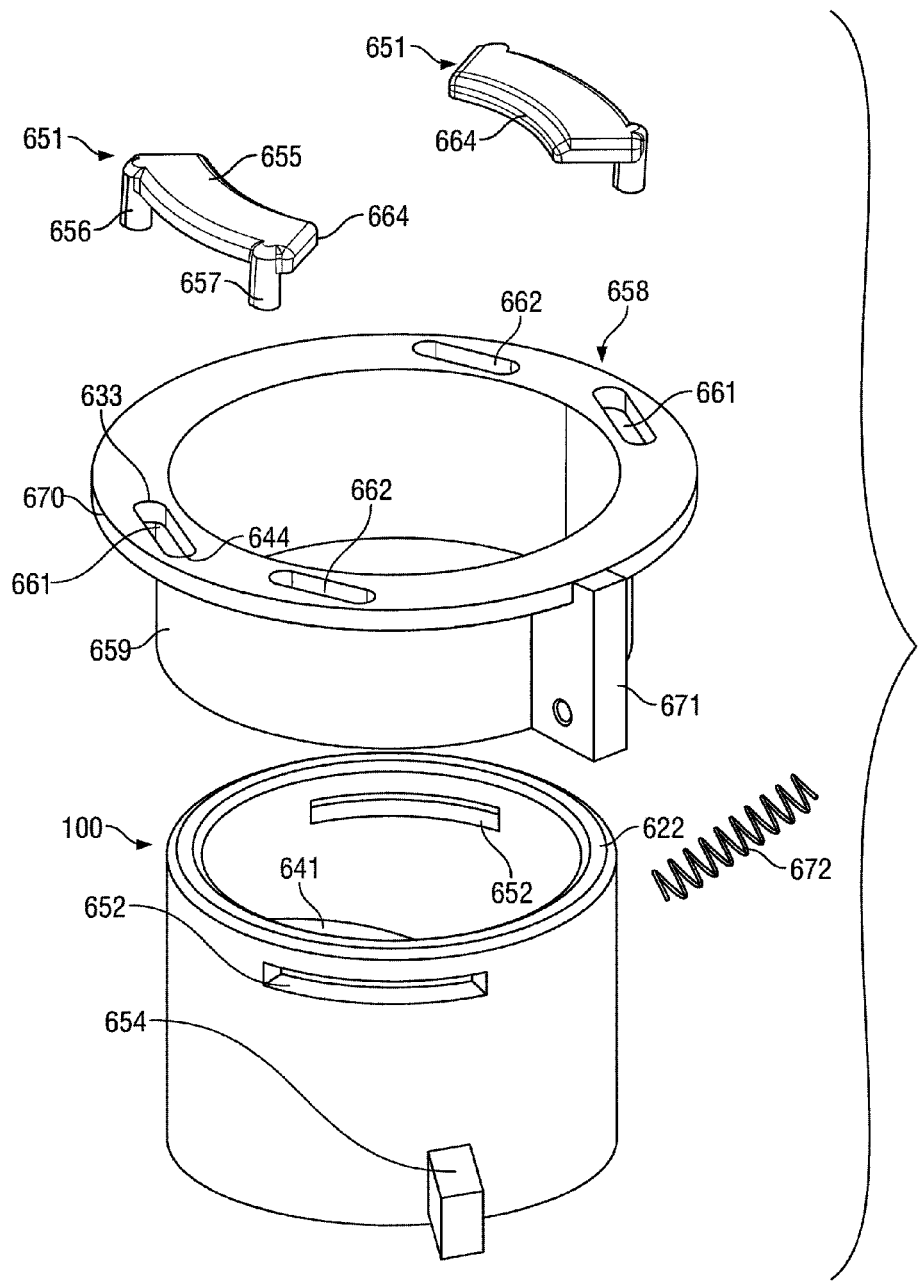
FIG. 23 is a schematic exploded top pictorial view of the actuator assembly shown in FIG. 22.
Figure 24:
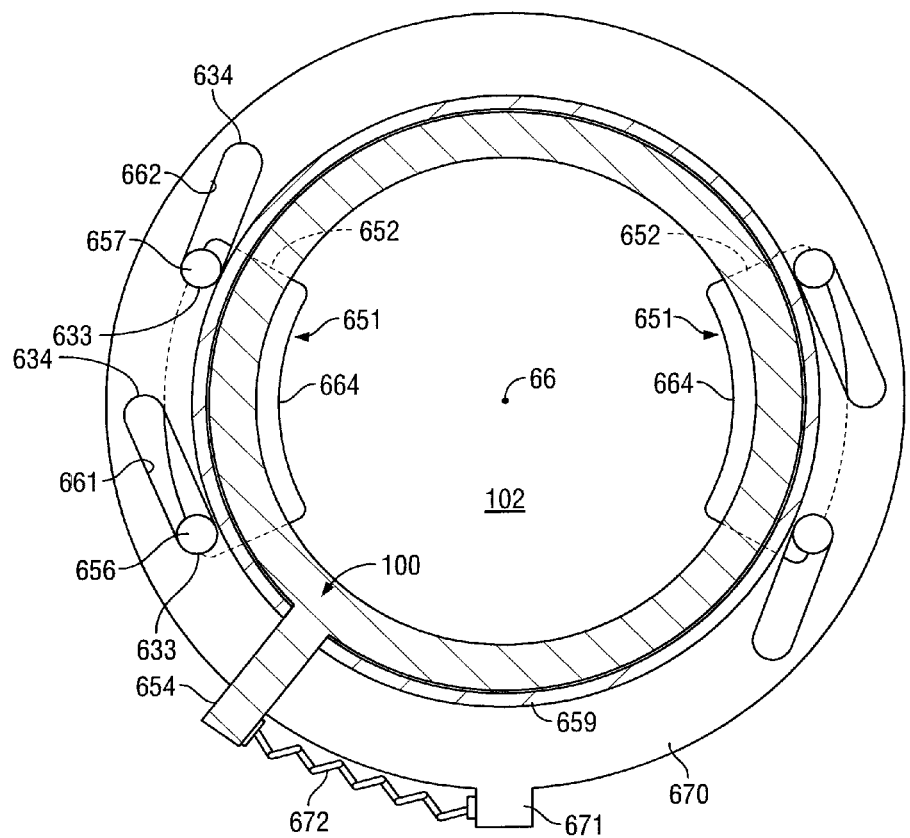
FIG. 24 is a cross-sectional bottom view along section line K-K' in FIG. 22.
Figure 25:
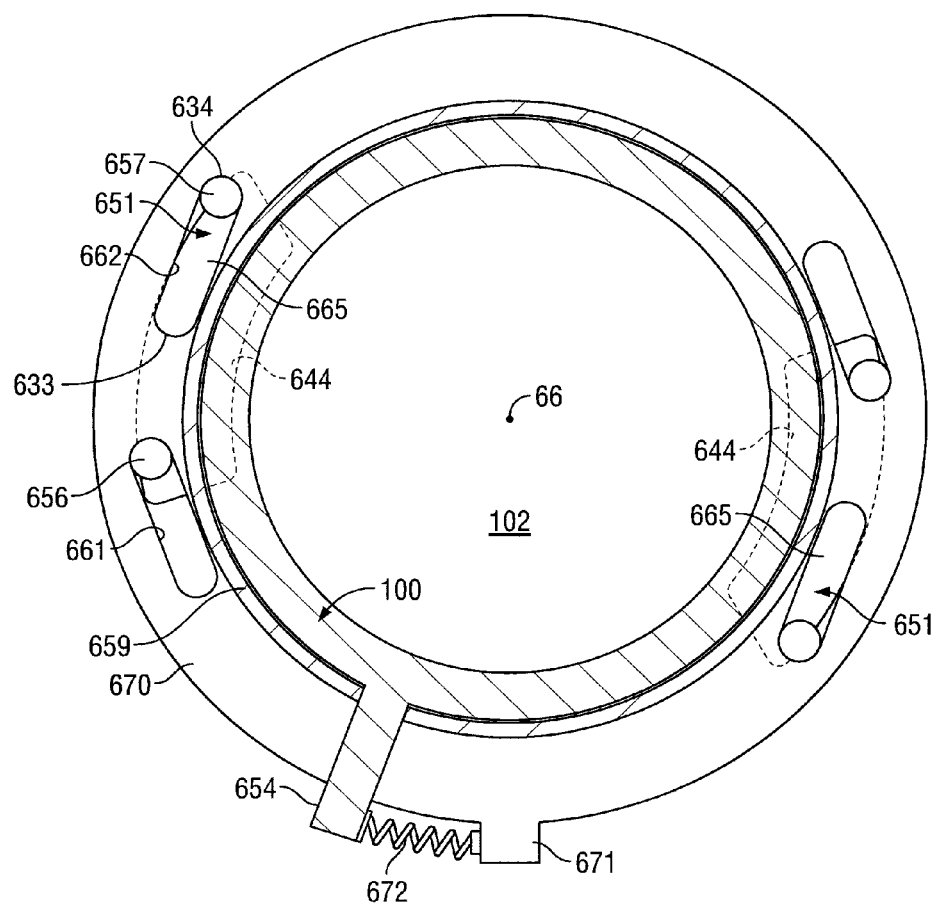
FIG. 25 is a cross-sectional view the same as FIG. 24, however, illustrating the cam ring rotated about the axis relative the remainder of the actuator compared to the position of FIG. 24.

Referring to FIGS. 22 to 25, the socket member 100 of the first embodiment has been modified to provide two slots 652 which extend through annular wall 622 at a diametrically opposed locations and with each slot extending radially through the annular wall 622 over a substantial circumferential extent. The circumferential extent of each slot 652 is shown to be larger than the axial extent of each latch member 651. The socket member 100 also includes a spring anchor tab 654 extending radially outwardly from the annular wall 622. Two latch members 651 are provided, each adapted to be received in a respective of the slots 652 for sliding radially inwardly and outwardly between an inner engagement position as seen in FIGS. 22 and 24 and a radially outer retracted position as seen in FIG. 25. Each latch member 651 has a plate portion 655 slidable within the respective slot 652 and a pair of spaced axially extending pins 656 and 657. A cam collar 658 is provided disposed coaxially about the socket member 100. The cam collar 658 includes cylindrical tube 659 with an upper radially outwardly extending flange 670. A spring anchor tab 671 extends radially outwardly from the tube 659. The tube 569 of the cam collar 658 is located coaxially about the sleeve member 100. A helical coil spring 672 extends circumferentially between the spring anchor tab 654 on the sleeve member 100 and the spring anchor tab 671 on the cam collar 658 so as to urge the cam collar 658 to rotate relative the socket member 100 to a first position shown in FIG. 24.

The flange 670 on the cam collar 658 has two pairs of cam slots 661 and 662 with each cam slot 661 adapted to receive a pin 656 and each cam slot 662 to receive a pin 657 of a respective latch member 651. As seen, each cam slot 661 and 662 extends linearly from a radially innermost end 663 to a radially outermost end 664. With the pins 556 and 557 received in the respective cam slots 661 and 662 and the plate portions 655 received within the respective slots 652, in a position as shown in FIGS. 22 and 24, an inner edge 664 of each plate portion 655 extends inwardly through the respective slot 652 into the central cavity 102 within the socket member 100. Reference is made to FIG. 25 which illustrates a configuration in which the cam collar 658 has been rotated about the axis 66 relative to the socket member 100 against the bias of the spring 672 compressing the spring 672 and with such rotation, the engagement of the pins 656 and 657 in the respective cam slots 661 has slid the plate portions 665 outwardly in respective slots 652 such that the edge 664 of each latch member 651 is drawn radially outwardly as to become recessed within the respective slots 652, that is, with the inner edge 664 of each plate portion 655 not extending radially into the central cavity 102 of the socket member 100.

The arrangement illustrated in FIGS. 22 to 26 illustrates one arrangement by which the latch members 651 are biased radially inwardly into the central cavity 102 of the socket member 100 and which latch members 651 can be moved radially outwardly either by forces urging the latch members 651 to move radially outwardly or by rotation of the cam collar 658 relative the sleeve member 100 against the bias of the spring 672.

Reference is made to FIGS. 26 to 29 in which for simplicity of illustration the engagement of the piston element 57 and socket member 100 are shown truncated as in FIG. 8 and in which each latch member 651 is shown to be biased radially inwardly by a simplistic arrow 663 without showing other element such as the cam collar 658. In FIGS. 26 to 29, the latch members 651 are shown in schematic cross-section which does not show either of the pins 656 or 657.

FIG. 26 schematically illustrates the piston element 57 coaxially aligned with the socket member 100 as, for example, in an arrangement such as shown in FIG. 3 but out of rotational alignment. FIGS. 27 to 29 illustrate relative axial movement of the piston element 57 and the socket member 100 towards movement to an arrangement in which the piston element 57 is in a coupled orientation in the socket member 100 as shown in FIG. 29.

In FIG. 26, the piston element 57 is shown as being approximately 90 degrees out of rotational alignment with the socket member 100 and in movement through the positions of FIG. 27 to FIG. 28 to FIG. 29 in sequence, engagement between the key member 616 and the cam ramp 640 relatively rotates the piston element 57 to a position in which it comes to be in rotational alignment with the sleeve member 100 and with the key member 616 to become engaged within the keyway 633 in a coupled orientation. Such rotational interaction between the piston element 57 and the socket member 100 is the same in the second embodiment as described in the first embodiment.

With relative axial movement of the piston element 57 towards the socket member 100, the engagement flange 650 on the piston element 57 engages the latch members 651 to bias the latch members 651 radially outwardly such as seen, for example, in FIG. 28 such that after the engagement flange 650 passes outwardly past the latch members 651, the latch members 651 may under the bias of the spring 672 return to the radially inner position but axially inwardly of the engagement flange 650 as seen in FIG. 29 to hold the engagement flange 650 in a latched position in which the engagement flange 650 cannot be moved axially inwardly past the latch members 651.

As can be seen in FIG. 27, the engagement flange 650 is disposed axially inwardly of the catch members 651. FIG. 28 illustrates a condition in which the engagement flange has been moved axially towards the socket member 100 from the position of FIG. 27 to a position in which frustoconical camming surfaces 664 carried on the engagement flange 650 engage frustoconical cam surfaces 665 forming the edge 664 of the latch members 651. With further relative axial movement of the piston element 57 from the position of FIG. 28 to the position of FIG. 29, the latch members 651 are moved outwardly, by the engagement between the camming surfaces 664 and the cam surfaces 665, sufficiently that the engagement flange 650 can pass axially outwardly of the latch members 651, at which point, each latch member 651 moves radially inwardly to its inner latching position as seen in FIG. 29 under the bias of the spring 672. FIG. 29 illustrates a condition in which the piston element 57 is in a coupled orientation within the sleeve member 100 with the key member 616 fully seated within the keyway 633 and the engagement flange 651 axially inwardly of the latching members 651. With the piston element 57 in a coupled orientation in the sleeve member 100 as shown in FIG. 29, the piston element 57 and the sleeve member 100 are coupled together for axial movement in unison inwardly or outwardly.

When a cartridge 13 may be desired to be removed from the dispenser 10, the camming collar 658 is rotated relative to the sleeve member 100 against the bias of the spring 692 so as to move the latch members 651 radially outwardly sufficiently to permit the engagement flange 650 to move axially inwardly past the latch members 100 and permit the socket member 57 to be axially slid out of the socket member 100. The camming collar 658 may be rotated against the bias of the spring 692 as by a user engaging the spring anchor tab 671 when the dispenser is in a position as seen in FIG. 2. Various mechanical arrangements may be provided to suitably rotate the camming collar 658.

Figure 30:
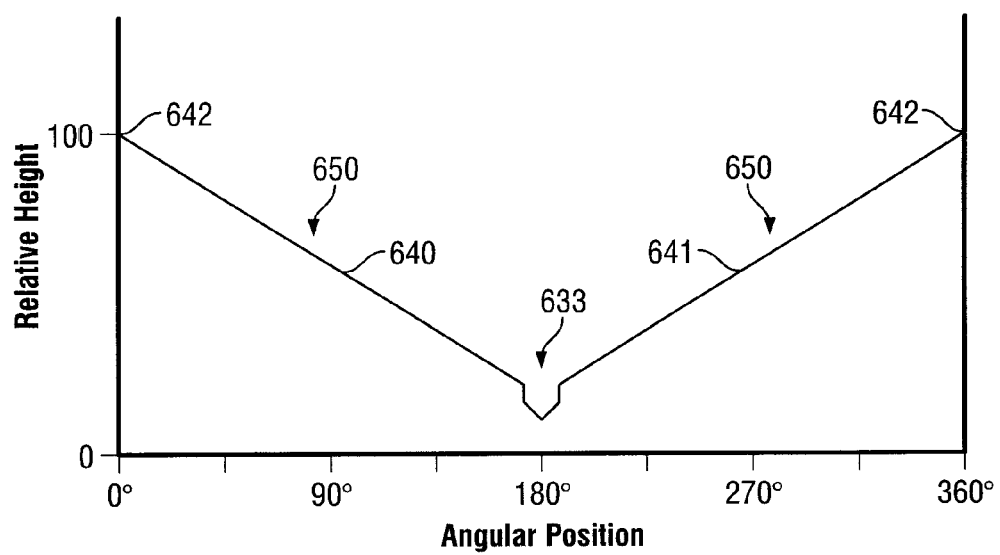
FIG. 30 is a table for the socket member illustrated in FIG. 8 plotting the relative height of axially inwardly directed surfaces as a function of the angular position about the center axis.

Reference is made to FIG. 30 which illustrates a table plotting for the socket member 100 illustrated in FIG. 8 the relative height above the bottom surface 35 of the actuator plate 32 that the axially inwardly directed surfaces of the shoulder 650 and the keyway 630 are located as a function of the angular position about the axis 66 of a plane which extends radially outwardly from the axis 66. FIG. 30 illustrates the keyway 633 as being centered at 180 degrees and the cam apex 642 being disposed at 0 degrees and 360 degrees. In accordance with this embodiment, a maximum rotation of about up to 180 degrees is required to place the piston element 57 and the socket member 100 into rotational alignment, with a maximum requirement of about up to 180 degrees rotation clockwise or about up to 180 degrees rotation counterclockwise.

Figure 32:
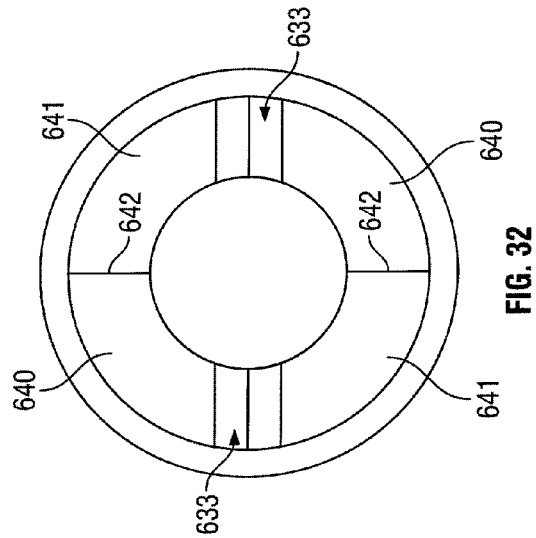
FIG. 32 is a top view similar to FIG. 9 but showing the socket member as in FIG. 31 from section line F-F'.
Figure 31:
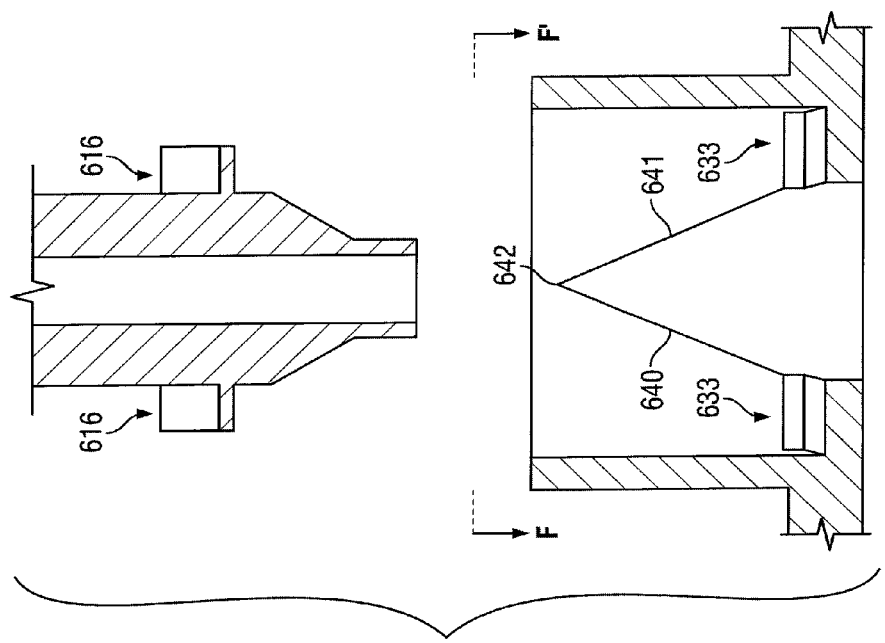
FIG. 31 is a cross-sectional side view similar to FIG. 8 but showing a piston element and a socket member in accordance with a third embodiment of the present invention.
Figure 33:
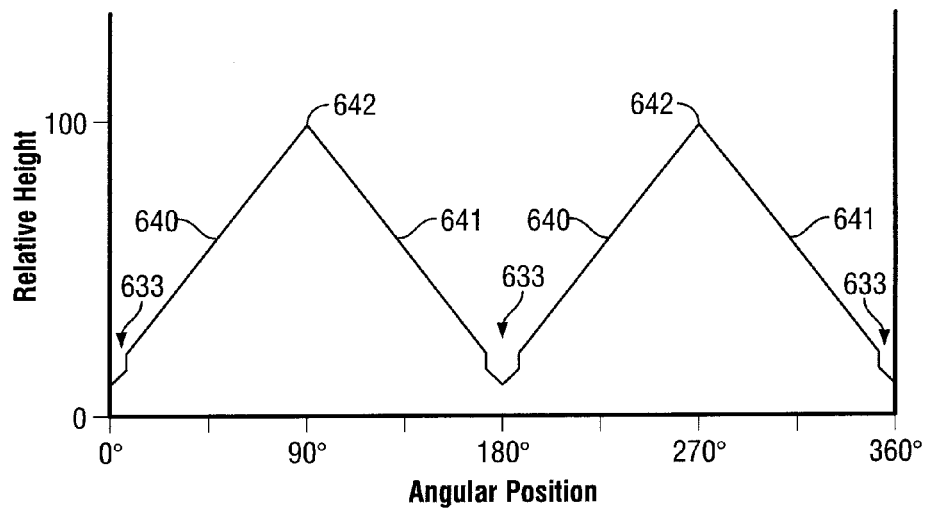
FIG. 33 is a table similar to FIG. 30 but showing the third embodiment of the socket member shown in FIGS. 31 and 32.

Reference is made to FIGS. 31, 32 and 33 showing a third embodiment of the present invention. FIG. 31 is a cross-sectional side view similar to FIG. 8 but showing a piston element 57 and a socket member 100 in accordance with a third embodiment of the present invention. FIG. 32 is a top view similar to FIG. 9 but showing the socket member 100 as in FIG. 31 from section line F-F'. FIG. 33 is a table similar to FIG. 30 but showing the third embodiment of the socket member shown in FIGS. 31 and 32.

In the third embodiment of FIGS. 31 to 33, two keyways 633 are provided on the socket member 100 with camming ramp portions 640 and 641 extending downwardly from each of the two ramp apex 642 circumferentially in between each of the two keyways 633. In this arrangement, a maximum of up to about 90 degrees rotation is required with rotation required to be either clockwise or counterclockwise. FIG. 31 includes an axial cross-sectional view through the forward portion of a piston element 57 in accordance with the third embodiment having two keyway members 616 at diametrically opposed locations. This third embodiment of the piston element 57 is adapted for use with the third embodiment of the socket member shown in FIG. 31 in a manner that on reaching rotational alignment, each of the two key members 616 will become rotationally aligned and be received within a respective of the two keyways 633.

In FIG. 31, while two keyways 633 are shown to be spaced 180 degrees from each other, this is not necessary and the keyways 633 may be spaced any angular degrees apart from each other, assuming that the piston element 57 carries but a single key member 616 as shown, for example, in FIG. 6.

Figure 34:
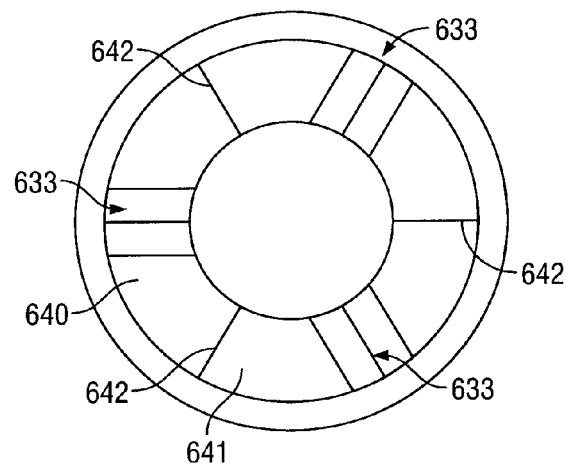
FIG. 34 is a top view similar to FIG. 9 but of a socket member of a fourth embodiment of the present invention.
Figure 35:
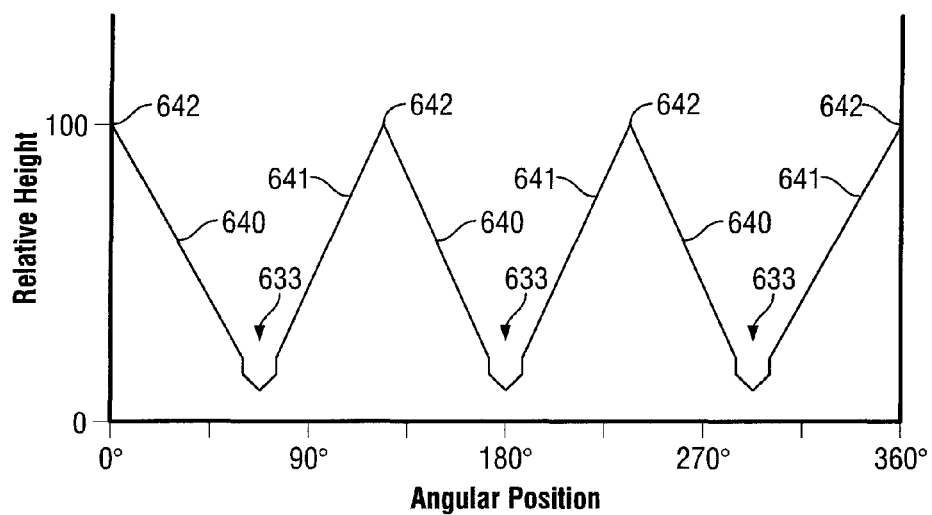
FIG. 35 is a table similar to FIG. 30 but of the fourth embodiment of the socket member shown in FIG. 34.

Reference is made to FIGS. 34 and 35 illustrating a fourth embodiment of a socket member 100 in which three keyways 633 are provided on 60 degrees centers. FIG. 34 is a top view similar to FIG. 9 but of the fourth embodiment with three keyways 633 and three ramp apex 642 with camming ramp portions 640 and 641 therebetween. FIG. 35 is a table similar to FIG. 30 but of the socket member shown in FIG. 34. The socket member 100 in FIGS. 34 and 35 is adapted to rotate piston element 57 a maximum of up to about 60 degrees in either direction and so that a key member 616 may become engaged within one of the three keyways 633. The piston element 57 may carry one, two or three key members 616 such that if there are two or three key members 616, the key members 616 are spaced on the piston element centered 120 degrees apart. While not illustrated in any drawing, other embodiments of the invention may be provided to similarly provide for four or more circumferentially spaced keyways 633 on the socket member 100.

Figure 36:
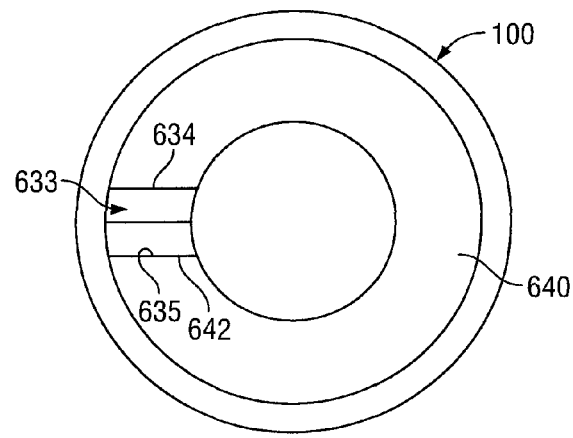
FIG. 36 shows a top view similar to FIG. 9 but of a socket member of a fifth embodiment of the present invention.
Figure 37:
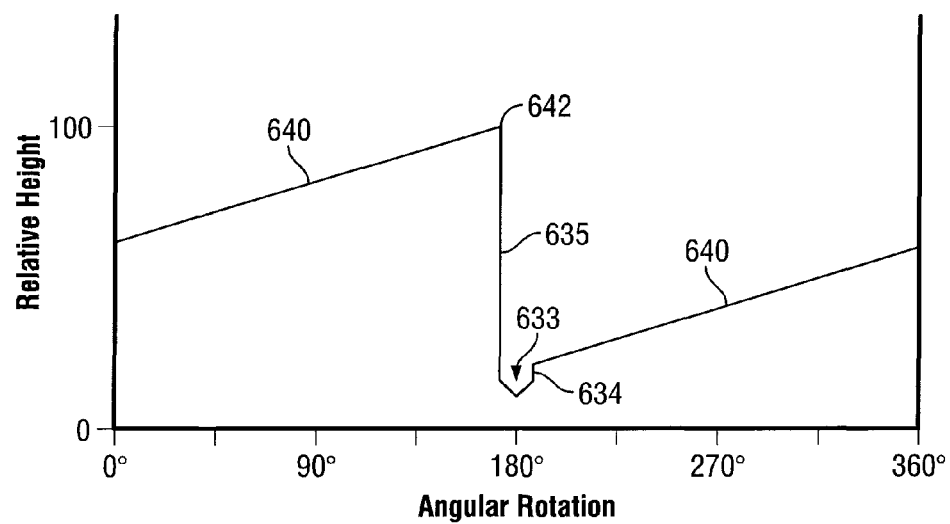
FIG. 37 is a table similar to FIG. 30 but of the fifth embodiment of the socket member shown in FIG. 36.

Reference is made to FIGS. 36 and 37 which show a fifth embodiment of a socket member 100. FIG. 36 shows a top view similar to FIG. 9 but of a socket member 100 of the fifth embodiment of the present invention. FIG. 37 is a table similar to FIG. 30 but of the socket member shown in FIG. 36.

In the fifth embodiment of FIGS. 36 and 37, a single keyway 633 is provided and a single camming ramp portion 640 is provided which extends from a ramp apex 642 which is at the axially innermost end of the side wall 635 of the keyway. The ramp portion 640 is axially farthest inward at side wall 635 and axially least inwardly at side wall 634. Relative rotation of the socket member 100 and a piston element to a maximum of about 360 degrees in one direction is required to provide for rotational alignment. A mirror image arrangement could be provided in which the relative rotation is to be in an opposite direction to that in FIGS. 36 and 37.

Figure 38:
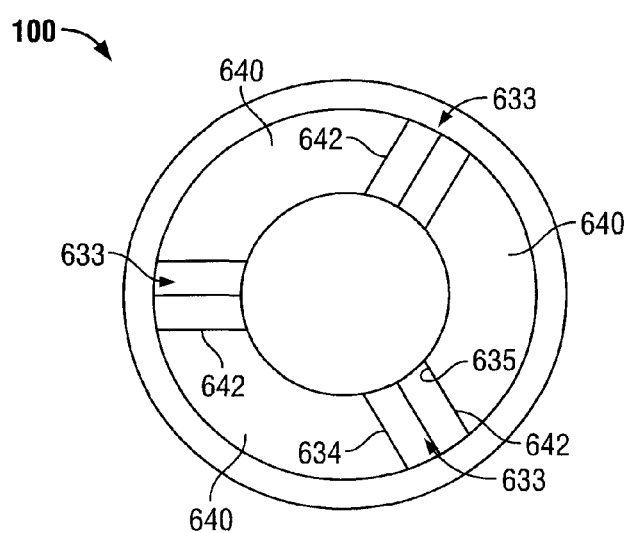
FIG. 38 is a top view similar to FIG. 9 but of a socket member in accordance with a sixth embodiment of the present invention.
Figure 39:
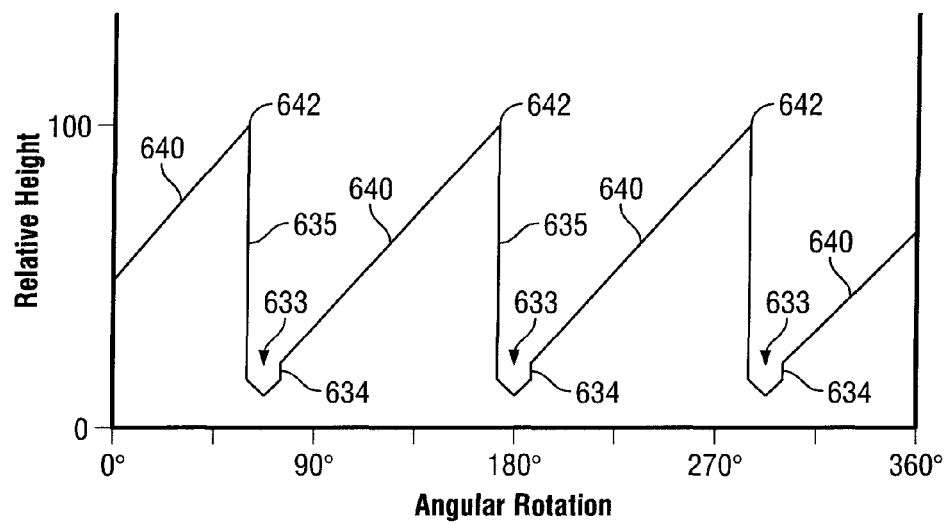
FIG. 39 is a table similar to FIG. 30 but of the sixth embodiment of the socket member shown in FIG. 38.

Reference is made to FIGS. 38 and 39 which illustrate a sixth embodiment of a socket member 100 of the present invention. FIG. 38 is a top view similar to FIG. 9 but of a socket member in accordance with the sixth embodiment.

FIG. 39 is a table similar to FIG. 30 but of the socket member shown in FIG. 38. FIGS. 38 and 39 show a socket member 100 with three keyways 633 and three camming ramp portions 640 between the keyways 633 so as to provide for unidirectional rotation similar to the fifth embodiment of FIGS. 36 and 37. FIG. 39 thus requires relative rotation of the piston element 57 and the socket member 100 but in one direction up to a maximum of 120 degrees in one direction and which can be utilized with a piston element 57 having one or more key members 616, however, with the key members 616 to be equally spaced on 120 degrees centers if there is more than one key member 616.

Figure 40:
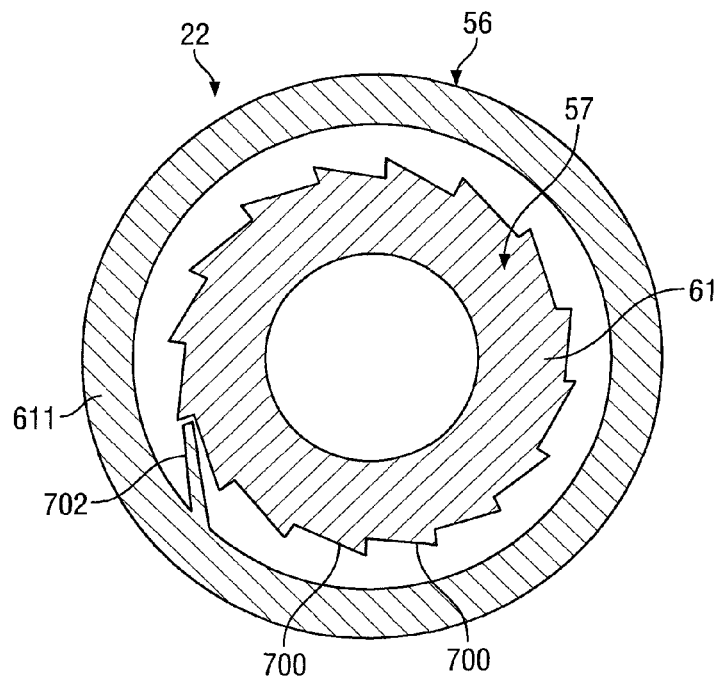
FIG. 40 comprising a cross-section along section line J-J' in FIG. 7, however, with the piston element modified to have directionally ramped gear teeth.

In accordance with the embodiments of the present invention, a camming arrangement is provided for engagement between the piston element 57 and the socket member 100 such that with relative axial movement and with the piston element 57 and socket member 100 in coaxial alignment, engagement between camming surfaces results in relative rotation coaxially about the axis from positions out of rotational alignment to positions in rotational alignment. The relative rotation required may be permitted to be both clockwise and counterclockwise or can be limited to be merely clockwise or merely counterclockwise. In accordance with the present invention, the socket member 100 and the piston element 57 may be arranged such that merely relative rotation in one direction is permitted. For example, in accordance with the embodiment illustrated in FIG. 7, a mechanism may be provided intermediate the piston chamber-forming member 56 and the piston element 57 which prevents relative rotation in one direction yet permits rotation in the other direction. Such an arrangement is schematically illustrated in FIG. 40 comprising a cross-section along section line J-J' in FIG. 7, however, with the piston element 57 modified to have directionally ramped gear teeth 700 being provided about the stem 61 to be engaged by a flexible ratcheting pawl 702 on the stop flange 611 of the piston chamber-forming member 56 so as to permit relative rotation in one direction and prevent relative rotation in the opposite direction. In accordance with the present invention, preferably a pump assembly 22 as shown in FIG. 40 is utilized with a socket member 100 such as seen in FIG. 36 or 38 for unidirectional rotation in the same direction. If a pump assembly 22 as shown in FIG. 40 which prevents counterclockwise rotation of the piston element 57 relative the socket member is inserted into a socket member 100 as in FIG. 37 which requires clockwise rotation for relative movement to rotational alignment, then incompatibility would arise which would prevent proper operation of the dispenser.

As another arrangement (not shown) to provide for merely unidirectional rotation of the piston element 57 of the first embodiment of FIG. 7, the spring 606 may be modified to have circumferentially directed ends of the wire forming the spring 606 to be engaged at each end with oppositely directed circumferentially directed shoulders within the annular channel 617 on the piston element 57 and the piston chamber-forming member 56 such that the spring 606 would permit relative rotation in one direction but not the other.

The first embodiment disclosed illustrates relative axial movement of the piston element 57 and the socket member 100 providing for relative rotation towards moving from being out of rotational alignment to being in rotational alignment. Once rotation alignment is provided, the first embodiment also provides for relative axial sliding to be stopped in a desired location, as by the axial engagement between axially outwardly directed surfaces of the key member 616 and the axially inwardly directed surfaces of the keyway 633. Additionally, in the first embodiment, engagement between the key member 616 and the keyway 633 provides for rotational stopping, that is, once in the coupled orientation preventing the relative rotation about the axis 66 of the piston element 57 and the socket member 100 by the engagement between the circumferentially extending surfaces 634 and 635 of the key member 616 and the circumferentially extending surfaces 644 and 645 of the socket member 100. Thus, in the first preferred embodiment, engagement between the key member 616 and the shoulder 630 or the keyway 633 provides each of the functions of inducing rotation, providing an axial stop against axial movement in at least one direction and providing a rotational stop against rotational movements in either direction. The features of providing rotation, providing an axial stop and providing a rotation stop need not all be provided by merely the key member 616 and the keyway 633.

Figure 41:
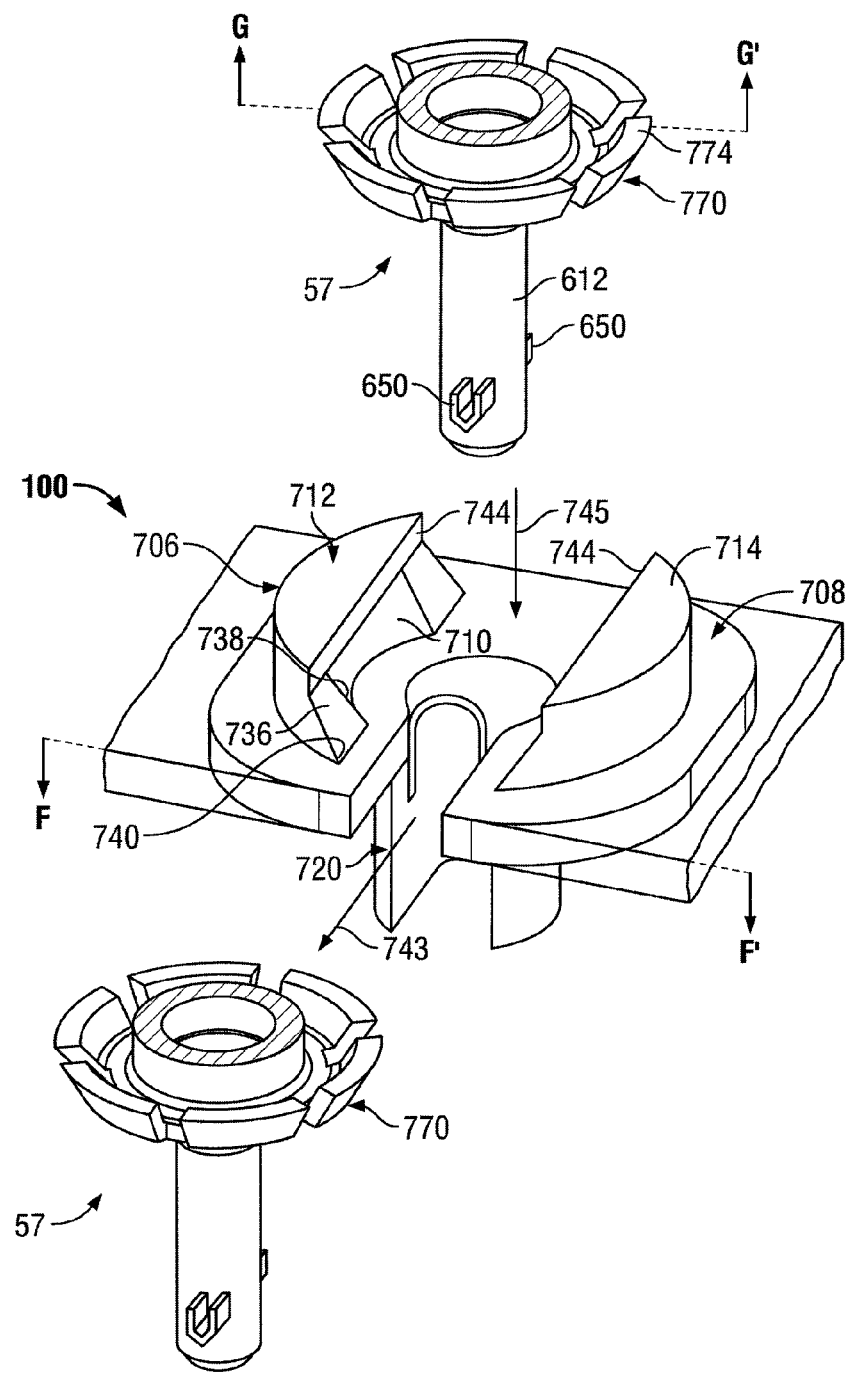
FIG. 41 is a schematic pictorial view of a seventh embodiment of a piston element and socket member in accordance with the present invention.
Figure 42:
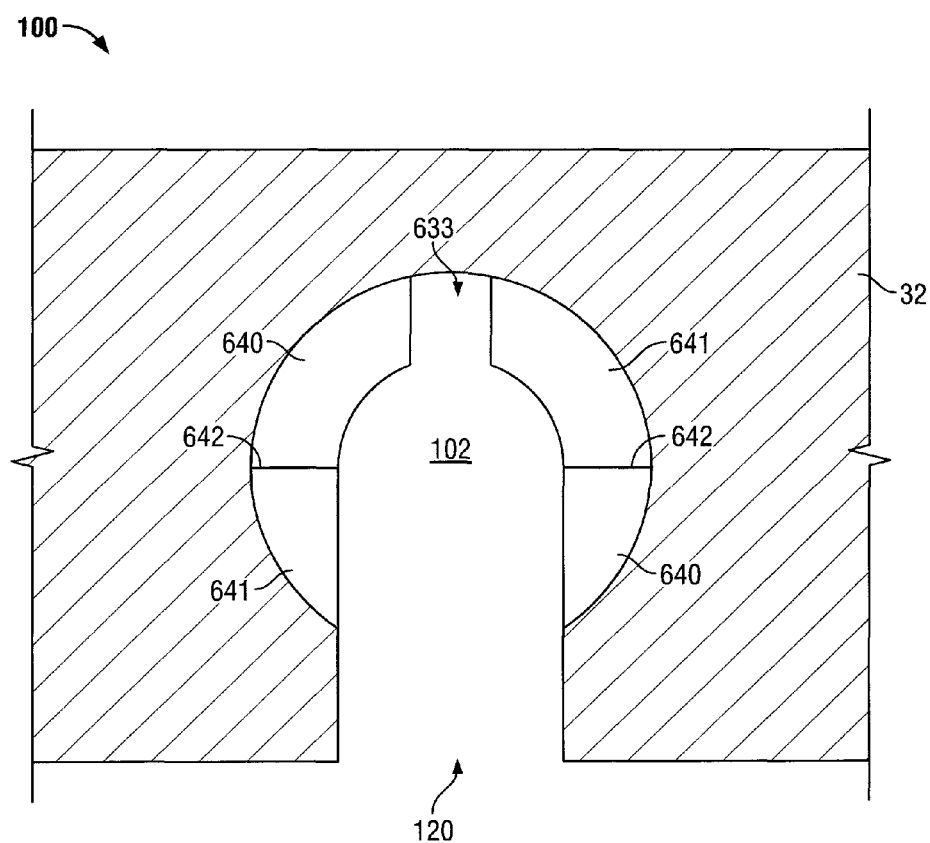
FIG. 42 is a cross-sectional view through the socket member of FIG. 41 along section line F-F'.

Reference is made to FIGS. 41 to 47 illustrating a seventh embodiment of a piston element 57 and socket member 100 in accordance with the present invention. As seen in FIG. 41, the piston element 57 which is shown truncated is similar to the piston element shown in the second embodiment of FIG. 21 carrying an engagement flange 650, however, with the forward portion 612 forward of the engagement flange 650 being of a relatively reduced diameter and with two key members 616 provided at diametrically opposed locations.

Figure 43:
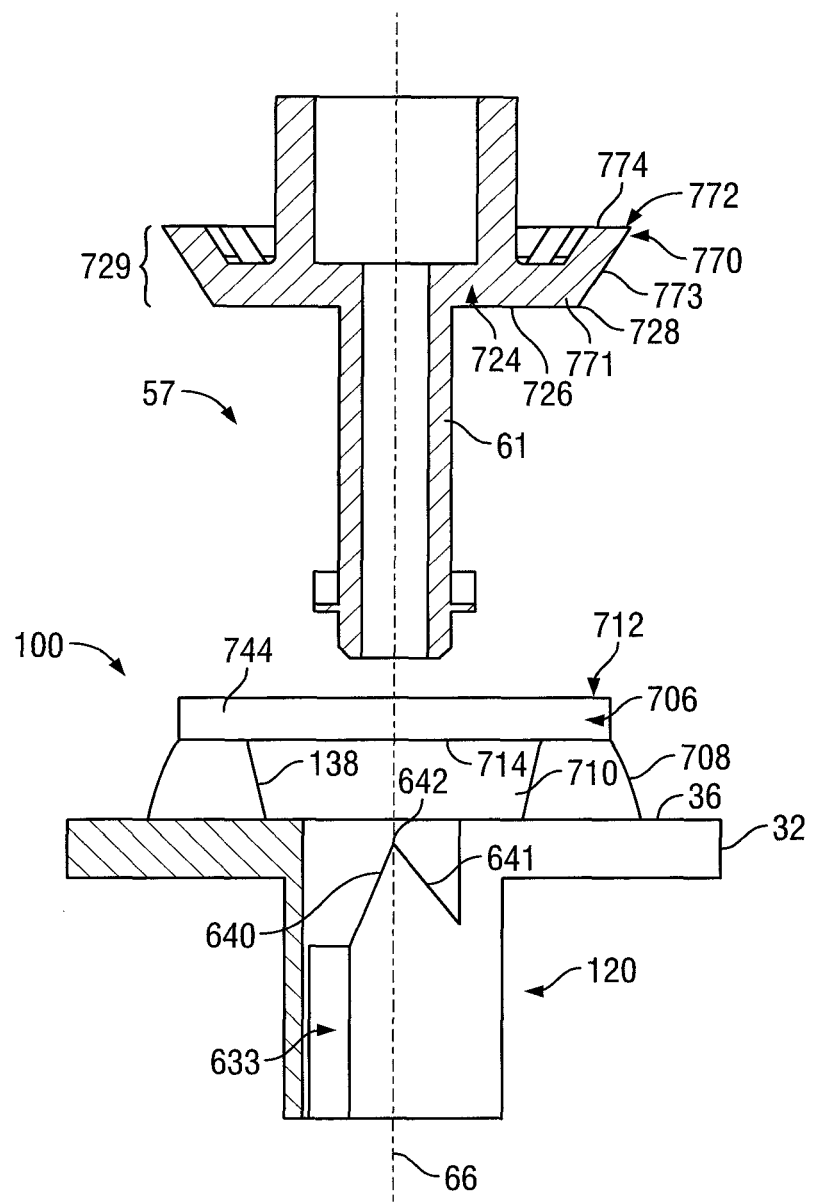
FIG. 43 is a vertical cross-section along section line G-G' in FIG. 41 showing the piston element disposed above the socket member.
Figure 45:
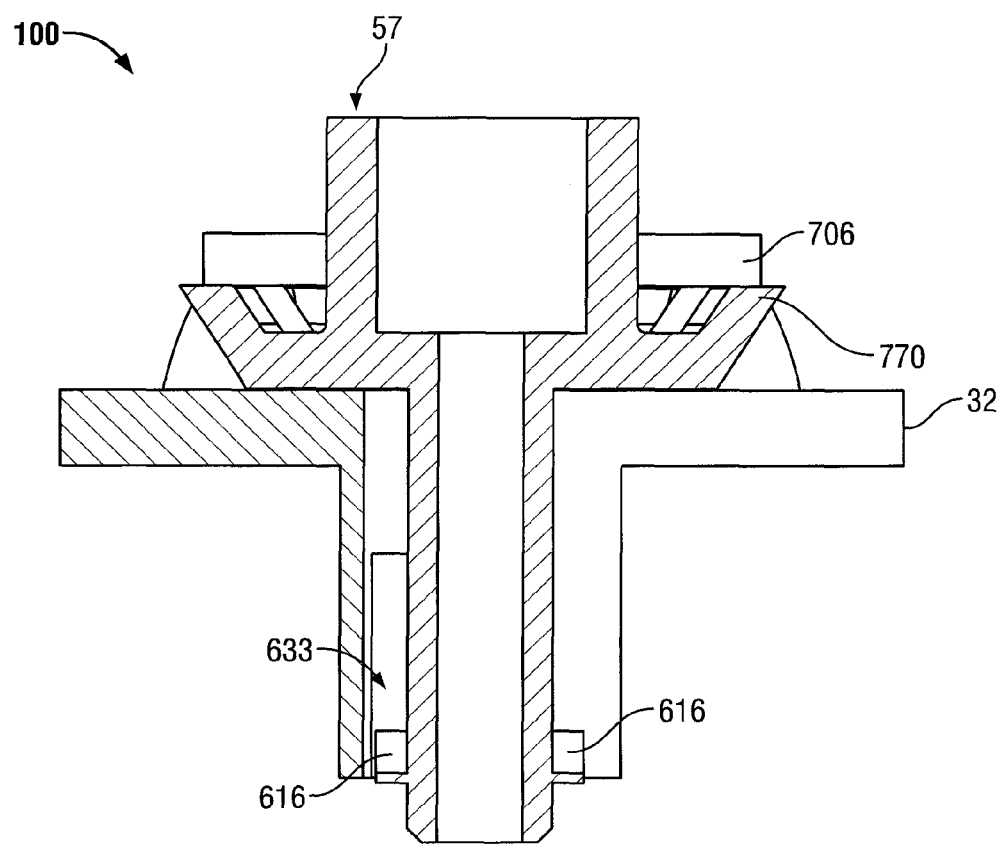
FIG. 45 is a cross-sectional view similar to FIG. 43 but with the piston element fully inserted into the socket member.
Figure 46:
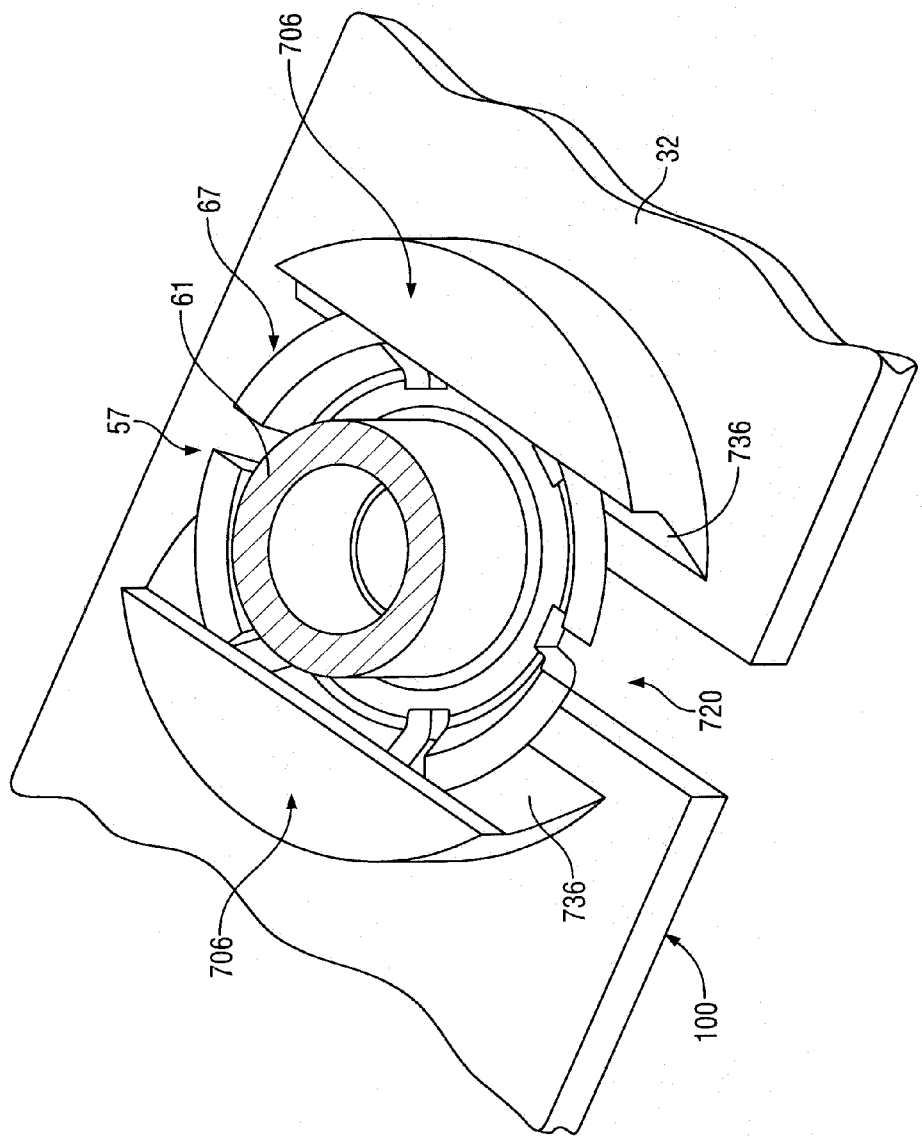
FIG. 46 is a top pictorial view of FIG. 45.
Figure 47:
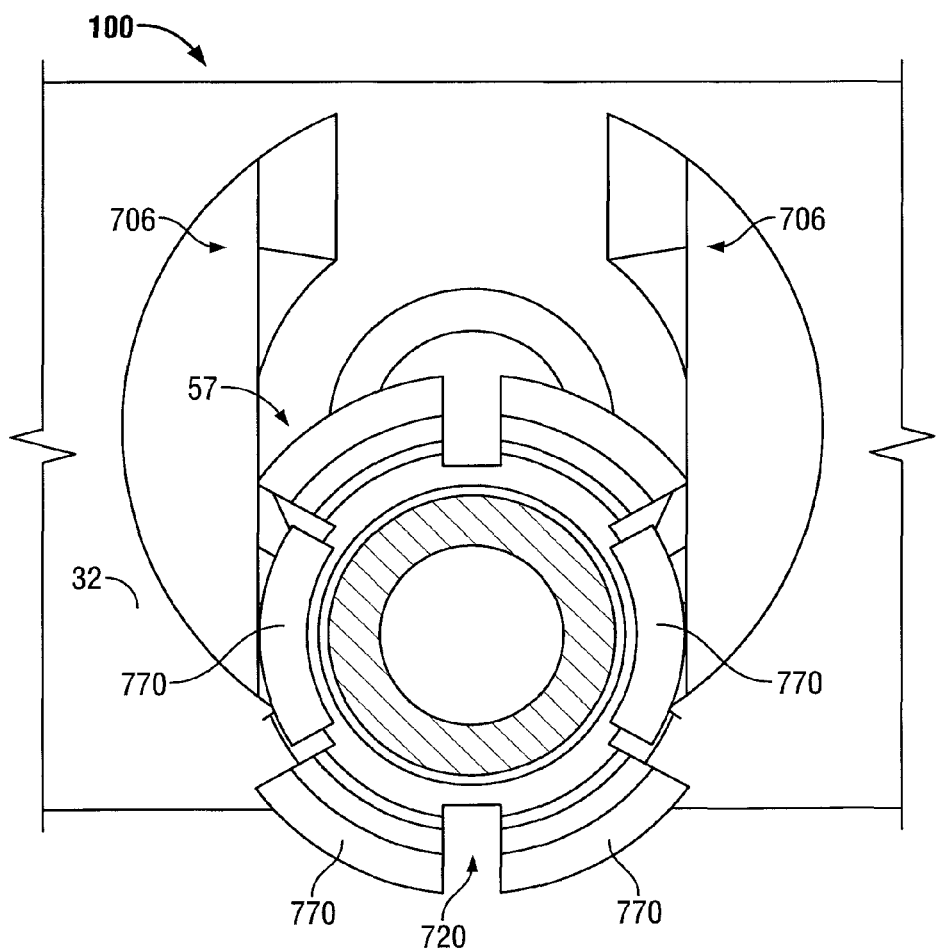
FIG. 47 is a top view of the embodiment as shown in FIGS. 45 and 46 but with the piston element moved radially relative the socket member from the position shown in FIGS. 45 and 46.

The actuator member 32 has been modified so as to include a pair of upstanding catches 706 provided as part of the socket member 100 to extend upwardly from the actuator plate on opposite sides of the socket cavity 102. These upstanding catches 706 cooperate with the engagement flange 650 in a manner as described in U.S. Pat. No. 8,113,388 to Ophardt et al, issued Feb. 14, 2012, the disclosure of which is incorporated herein by reference. The interaction between the catches 706 and the engagement flange 650 permits the piston element 57, when in coaxial alignment with the socket member 100 as seen in the upper portion of FIG. 1 to be moved axially downwardly as indicated by the arrow 745 from a position as seen in FIG. 43 to the position shown in FIG. 44 and subsequently to a coupled orientation as seen in FIG. 45 in which, as also shown in FIG. 46, the engagement flange 650 is secured between the engagement catches 706 and the actuator plate 32 in a coupled orientation. From this coupled orientation of FIGS. 45 and 46, the piston element 57 can be removed by relative radial movement in a direction indicated by the arrow 743 in the lower portion of FIG. 41 with as seen in FIG. 47, deflection of resilient fingers 770 forming the engagement flange 650 permitting the engagement flange 650 to be moved radially from between the catches 706.

In the embodiment of FIGS. 41 to 47, the socket member 100 has an exitway 720 provided from the cavity 102 opening radially forwardly relative the axis 66 between the catches 706. The socket member 100 carries, as best seen in top view in FIG. 42, a keyway 633 which extends axially through the socket member 100. The camming shoulders are provided to have a pair of ramp apex 642 diametrically opposed on either side of the keyway 633 with ramp surfaces 640 which slope axially outwardly from each ramp apex 642 to the respective keyway side walls 635 and 636. Additionally, camming ramp surfaces 641 slope axially outwardly from the ramp apex 642 circumferentially away from the keyway 633 towards the exitway 720. Thus, the configuration of the keyway 633 and the camming shoulders has a configuration similar to that illustrated in the embodiment of FIGS. 31 to 33 in which relative rotation up to a maximum of about 90 degrees is required to place one of two key members 616 into rotational alignment with a keyway 633. The seventh embodiment is illustrated in FIGS. 41 to 46 with the piston element 57 in rotational alignment with the socket member 100. If the piston element 57 is disposed above the socket member coaxially aligned but out of rotational alignment, then engagement between the key members 616 and the camming surfaces 640 and 641 will rotate the piston element 57 to come into rotational alignment with the socket member 100 with relative axial movement of the piston element 57 and the socket member 100.

The engagement flange 650 comprises a resilient engagement member comprising a plurality of circumferentially spaced resilient fingers 770. Each of the finger members 770 is coupled to the stem at a radial inner end 771 and extends radially outwardly and axially inwardly to a distal end 772. Each finger member 770 on the engagement flange 650 prevents an axially outwardly and radially directed camming surface 773. Each finger member 770 has at its distal end 772 an inwardly directed shoulder 774. Each finger member 770 has an inherent bias to assume an extended position as seen in each of FIGS. 41 to 46 but to be deflectable to have its distal ends deflected radially inwardly as shown in FIG. 47.

Each catch 706 has a side wall 708 with an interior surface 710 facing inwardly and defining a portion of the socket cavity 102 radially therein. Each catch 706 has an inner end wall 712 which has an axially outwardly directed surface 714. The inner end wall 712 is axially spaced from the actuator plate 32 which forms, in effect, an outer end wall spaced axially from the inner end wall 112 and with such actuator plate/outer end wall 32 providing as the upper surface 36 of the actuator plate an axially inwardly directed interior surface. As can be seen, between the catches 706 a portion of the socket cavity 102 is defined radially between the interior surfaces 710 of the side wall 708 and axially between the interior surface 714 of the inner end wall 712 and the upper surface 36 of the outer end wall/actuator plate 32. Stem 61 has a radially outwardly extending annular flange 724 which carries the finger members 770 at a radially outwardly directed end of the flange 724. The flange is provided with a radially extending axially directed shoulder surface 726 which merges into an outer surface of the finger members 728 which merges into a generally frustoconically disposed camming surface 773. The camming surface 773 ends at its inner end at the axially inwardly directed radially extending shoulder 774. The inner surface of the finger members 770 is shown to have a generally frustoconical portion 729 which merges at its lower end into the inner shoulder surface 726 on the flange 724. The interior upper surface 36 of the outer end wall 32 inside the cavity 102 between the catches 706 corresponds closely to the size of the shoulder surface 726 of the flange 724 on the piston element 57. The interior surface 714 of the inner end wall 712 closely corresponds to the shape and size of the shoulder 774 of the finger members 770 of the piston element. The exitway 720 extends through the side wall 708 with the side wall 708 ending at a laterally directed cam surface 736 having an interior edge 738 and an exterior edge 740. Each of the frustoconical interior surfaces 710 of the side walls 708 ends forwardly at the interior edge 738.

FIG. 41 schematically shows the socket member 100 with the piston element disposed in two different uncoupled orientations. Firstly, FIG. 41 shows the piston element 57 disposed in an axially uncoupled orientation from which by movement axially in the direction of the arrow 745, the piston element may be moved from the axial uncoupled orientation to a coupled orientation shown, for example, in FIG. 45. Secondly, the piston element 57 is shown disposed radially forwardly of the socket member 100 in a radial uncoupled orientation to which the piston member 57 may be moved radially horizontally in the direction indicated by the arrow 743 from a coupled orientation as shown in FIG. 45.

Having regard to FIG. 41, the piston element 57 may be moved from an axially uncoupled orientation shown in FIG. 43 to the coupled orientation of FIG. 45 by relative axial movement. On such axial movement, the camming surfaces 773 on the finger members 770 come to engage the side wall surfaces 744 on the inner end wall 712 so as to deflect the finger members 770 from their unbiased inherent configuration to deflected configurations of different radial extents than the inherent configuration permitting the finger members 770 to pass axial past the inner end wall 712. In such axial insertion, the piston element 57 may be considered to move downwardly through an axially extending entranceway bordered by the side wall surfaces 744 of the inner end wall 712. Finger members 770 which are deflected to deflected configurations on movement between the side wall surfaces 744 of the inner end wall 712 will snap back to assume their inherent configuration once the camming surface 773 on the finger members 770 passes axially outwardly below the axially outwardly directed interior surfaces 714 of the inner end wall 712. As seen in FIG. 45 in a coupled orientation, the piston element 57 is secured to the socket member 100 against relative axial movement such that the piston element 57 and the socket member 100 may be moved to dispense fluid axially in unison.

From the coupled orientation shown in FIGS. 45 and 46, the piston element 57 may be moved radially from engagement with the socket member 100 by relative movement of the piston element 57 radially relative to the axis 66. In such radial movement, the camming surfaces 773 on the resilient fingers 770 engage the cam surfaces 736 and notably their interior edge 738 and as the piston element 57 is moved radially forwardly, such engagement causes the resilient finger members 770 on opposite sides of the exitway 720 to be deflected radially inwardly so as to permit the deflected resiliently fingers 770 to be moved radially through the exitway 720 as illustrated in FIG. 47. Concurrently, with the piston element 57 in rotational alignment with the socket member 100, the forward portion of the piston element 57 may slide forwardly through the exitway 720 with the keyway member 616 within the keyway 633 sliding radially forwardly from the keyway 633.

In the seventh embodiment of FIG. 41, as best seen for example, in FIG. 43, the keyway 633 extends axially entirely through the socket member 100. The interaction between the key member 616 and the keyway 633 does not provide an axial stop and axial stopping of the axial movement of the piston element 57 relative to the socket member 100 is provided by engagement between the engagement flange 650 and the actuator plate 32. In the seventh embodiment of FIG. 41, the key member 616 and the keyway 633 provide a rotational stop against axial movement once the key member 616 is received within the keyway 633.

Figure 44:
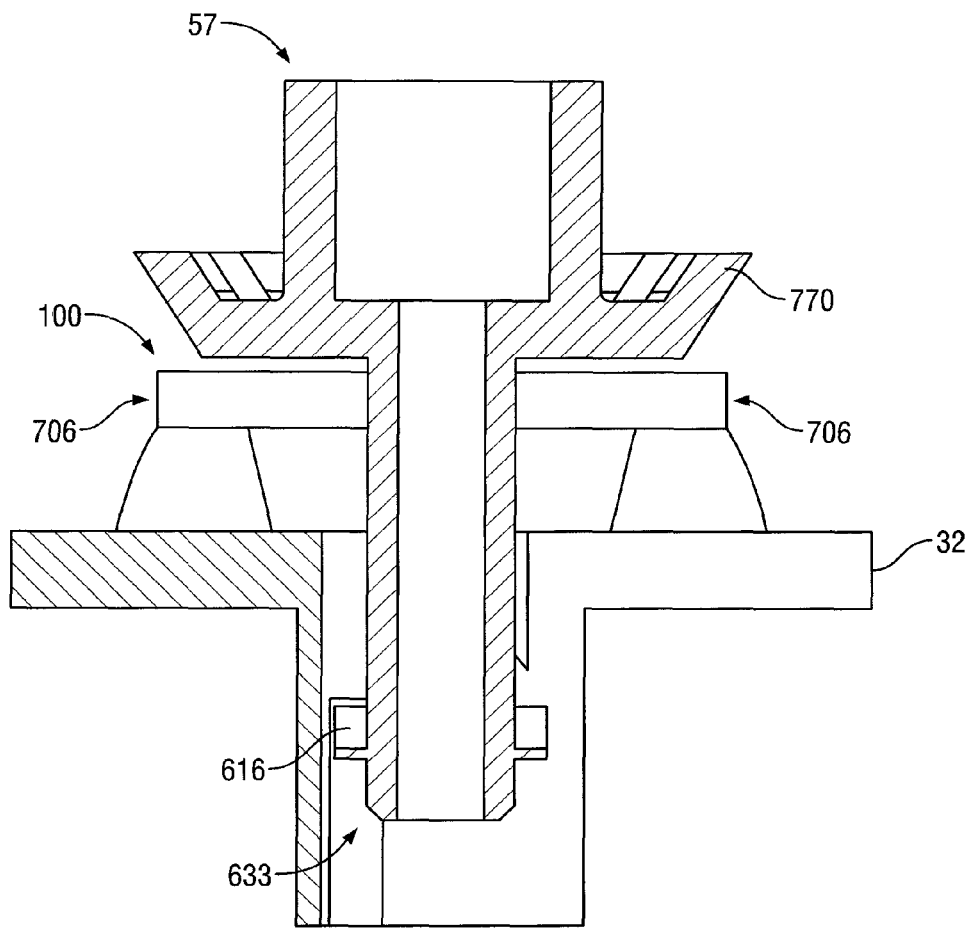
FIG. 44 is a cross-sectional view similar to FIG. 43 but with the socket member moved relatively upwardly relative the piston element.

In the seventh embodiment of FIG. 41, the rotation of the piston element 57 relative to the socket member 100 rotates the piston element 57 to be in rotational alignment prior to the resilient fingers 770 engaging the catches 706 as can be seen in FIG. 44 and is preferred although it is not necessary. The arrangement for rotating the piston element 57 relative to the socket member 100 can prevent the finger members 770 from assuming a coupled condition with the catches 706 if the piston element 57 is not in rotational alignment with the socket member 100 at a time when the finger members 770 come to engage the catches 706 and, thus, the relative axial location of each of the keyway members 616 and the ramp surfaces 640 and 641 need to be complementary.

By selecting different axial spacings of the key members 616 with complementary axial spacings of the cam ramps and keyways 633, various different configurations can be developed with certain piston elements 57 only compatible with certain complementary socket members and some piston elements 57 not operative with other socket members 100.

In addition to varying the axial location of the key member 616, an arrangement in which an axial stop can be provided on the piston element 57 and the socket member 100 separate from the keyway member 616 and the keyway 633. By varying the relative axial location of an axial stops, spacings can be provided for permitting certain piston elements 57 to be compatible with certain socket members and, as well, for other piston elements to be prevented from proper operation with other socket members.

In accordance with the present invention, varying the relative diameter of interacting elements of each of the piston element 57 and the socket member 100 can provide for different configurations which permit additional options for compatibility and incompatibility. For example, complementary pairings of piston elements 57 and socket members 100 have complementary diameters of the cylindrical nose segment 613 of the forward portion 612 of the stem and the inner opening 625 through the socket member.

Insofar as other pairings of piston elements 57 and socket members 100 have a stem and inner opening 625 of a larger diameter, then the larger diameter piston element would not be compatible with socket members 100 having a smaller diameter inner opening 625. In each of the embodiments, the camming surfaces and notably the cam ramps 640 and 641 have a radial extent which is less than the radial extent of the outer opening 626. The radial extent of the key member 616 of a piston element 57 may be made to be complementary to the radial extent of the outer opening 626 of a complementary socket member 100. Other piston elements 57 which have a key member 616 of a greater radius would not be compatible with the socket member having a smaller radius outer opening 626.

Figure 11:
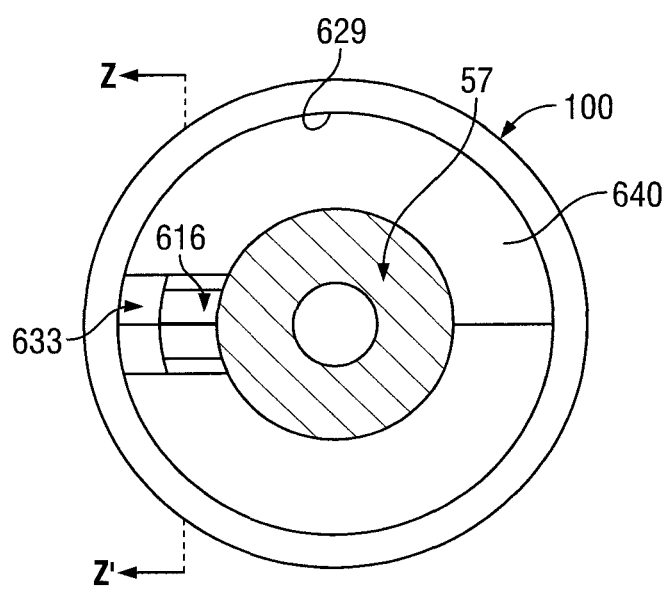
FIG. 11 is a top cross-sectional view of FIG. 8 along section line X-X' and also of FIG. 10 along section line Y-Y'.
Figure 12:
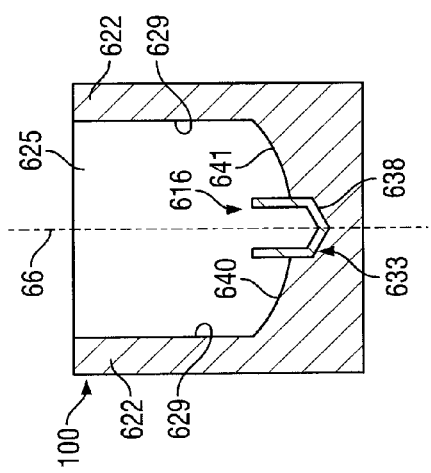
FIG. 12 is a vertical cross-section along section line Z-Z' on FIG. 11.

In the preferred embodiment as, for example, in the first preferred embodiment as illustrated in FIGS. 11 and 12, the keyway member 616 has a circumferentially extent which corresponds to the circumferential extent of the keyway 633. A piston element 57 which has a key member 616 of a greater circumferential extent would not be compatible with the socket member having a lesser circumferential extent.

By adopting one or more variants regarding the nature of the keying arrangement, various different complementary pairs of piston elements 57 and socket members 100 can be arranged which provide merely for compatibility of certain of the pairings and for incompatibility of others.

Reference is made to FIGS. 48 to 52 showing an eight embodiment of a piston element 57 and socket member 100 in accordance with the present invention.

Figure 48:
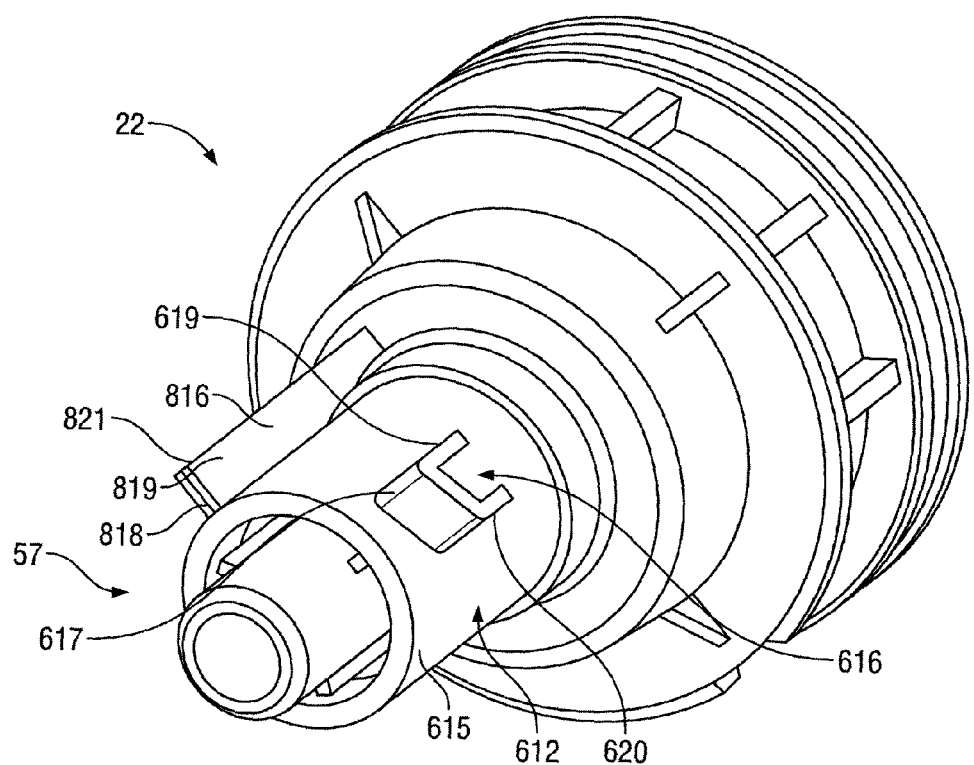
FIG. 48 is a perspective view of an eighth embodiment of the pump assembly similar to that shown in FIG. 6.

As seen in FIG. 48, the pump assembly 22 includes a piston element 57 having similarities to that shown in the first embodiment of FIG. 6. The forward portion 612 of the piston element 57 has a cylindrical segment 615 which carries the key member 616. The key member is shown to have parallel circumferentially directed outer side surfaces 619 and 620 and an axially outwardly directed front camming surface 617 disposed proximate the outer side surface 619. A secondary key member 816 is provided on the cylindrical segment 615 extending radially outwardly therefrom and presenting an axially outwardly directed front surface 818 and two parallel circumferentially directed outer side surfaces 819 and 820. The secondary key member 816 has a radially outwardly directed end surface 821.

Figure 49:
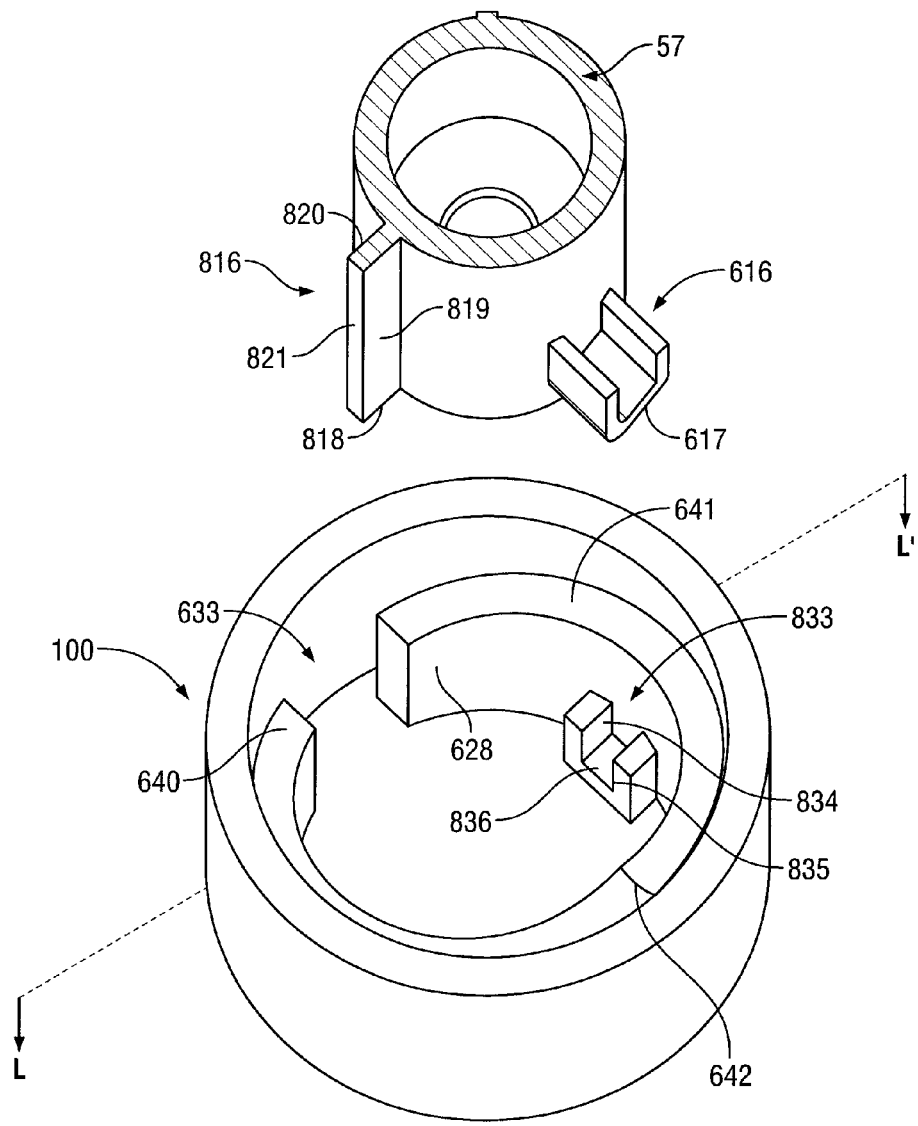
FIG. 49 is a schematic exploded partial perspective view showing a forward portion of a piston element of the piston pump of the eighth embodiment of FIG. 48 coaxially located above a socket member in accordance with the eighth embodiment.

The socket member 100 can best be seen in the top perspective view of FIG. 49 as being substantially the same as in the first embodiment, however, with the exception that the keyway 633 extends axially entirely through the socket member 100 and thus does not have the equivalent of the forward cam surfaces 636 and 637 or the valley apex 638 of the keyway 633 in the first embodiment. As best seen in FIG. 49, a secondary keyway 833 is provided to extend radially inwardly from the guide wall portion 628. The secondary keyway 833 is provided in a radially inwardly extending tab provided on the guide wall portion 628 having a limited circumferential extent and within which the secondary keyway 833 is formed between parallel side surfaces 834 and 835 which end at a forward stop surface 836. The secondary keyway 833 is of complementary shape and size to the secondary key member 816.

The secondary key member 816 has its end surface 821 extend radially outwardly to proximate the guide wall portion 628 and thus engagement between the guide wall portion 628 and the secondary key member 833 can be of assistance in locating the piston element 57 coaxially within the socket member 100.

As can best be seen in the side view of the socket member in FIG. 50, the axially innermost end of the primary keyway 633 is disposed above a height of the axially innermost entrance to the secondary keyway 833 by an axial difference greater than the difference that the axially outwardly directed end surface 818 of the secondary key member 816 is axially spaced from the most axially outwardly located surface of the front camming surface 617 of the primary key member 616. As a result, when the piston element 57 is in coaxial alignment with the socket member 100 and the piston element 57 is moved axially relative the socket member 100, engagement occurs between the primary key member 633 and the cam ramps 640 and 641 to rotate the piston element into rotational alignment with the socket member 100 before the secondary key member 816 engages the secondary keyway 833.

Figure 51:
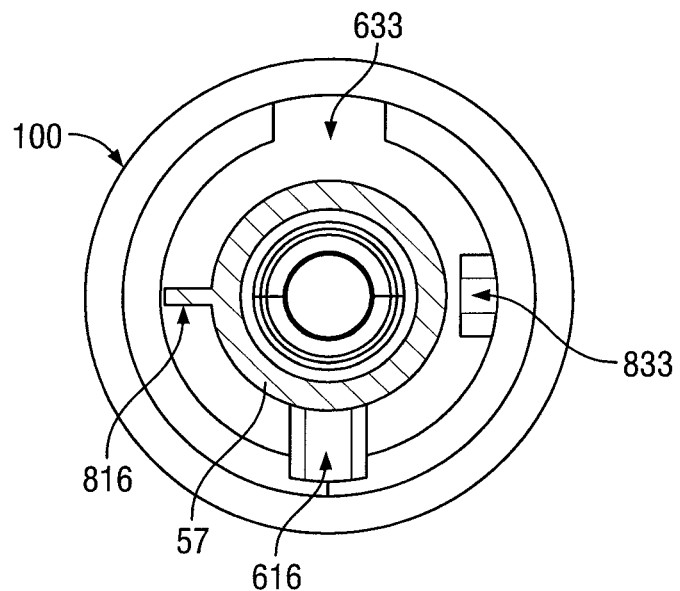
FIG. 51 is a vertical cross-sectional view along section line M-M' in FIG. 50.
Figure 52:
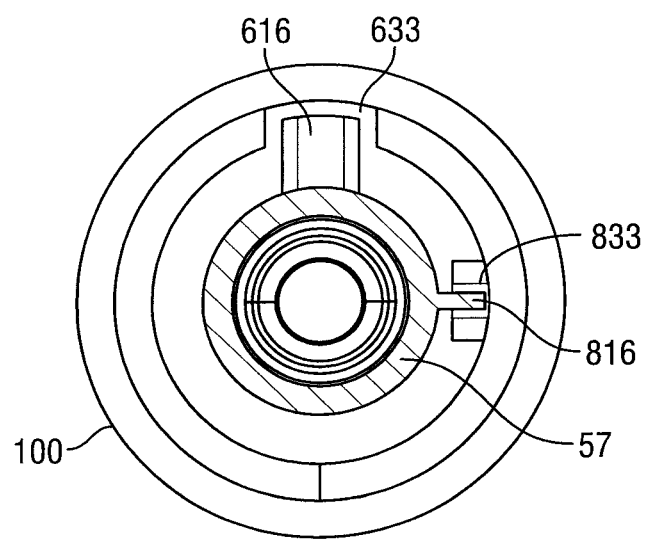
FIG. 52 is a cross-sectional top view the same as in FIG. 51 but with the piston element in rotational alignment with the socket member.

FIGS. 49, 50 and 51 illustrate a condition in which the piston element 57 is about 180 degrees out of rotational alignment with the socket member 100. With the piston element 57 and the socket member 100 in coaxial alignment on axial movement towards each other as seen in FIG. 51, the primary key member 616 will engage the cam ramp 640 or 641 for rotation from a rotational position out of axial alignment in FIG. 51 to a position in axial alignment as seen in FIG. 52 in which the primary key member 616 is circumferentially aligned with the keyway 633 and the secondary key member 816 is circumferentially aligned with the secondary keyway 833. On initially reaching the position of rotational alignment as seen in FIG. 52, the secondary key member 816 is axially inwardly of the secondary keyway 833 and with subsequent relative axial movement, with the primary key member 616 sliding axially within the primary keyway 633, the secondary key member 816 comes to be seated within the secondary keyway 833 providing an axial stop against relative movement further forwardly.

In the embodiment illustrated in FIGS. 49 to 52, the secondary key member 816 is provided circumferentially spaced 90 degrees from the primary key member 616 and the primary keyway 633 and the secondary keyway 833 are correspondingly circumferentially spaced 90 degrees. The circumferential angular spacing of the primary key member 613 and the secondary key member 813 may be selected to be any particularly desired angle in which case if a piston element 57 may be inserted into a socket member 100 having a different angular circumferential spacing of the primary keyway 633 and the secondary keyway 833, then the piston element 57 and the socket member 100 will not properly couple for dispensing as, for example, without a properly positioned axial stop to prevent relative axial sliding at a required location for proper operation of the piston pump.

Figure 53:
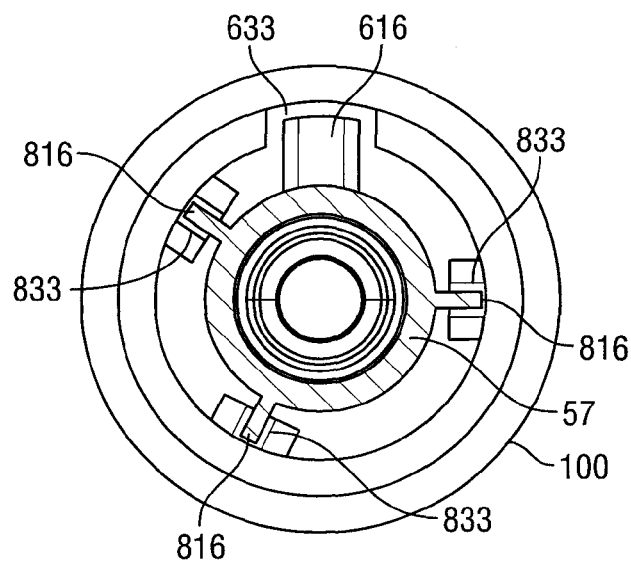
FIG. 53 is a cross-sectional top view the same as FIG. 51 but showing a ninth embodiment of a piston element and socket member in accordance with the present invention.

Reference is made to FIG. 53 which illustrates a partially cross-sectional top view the same as in FIG. 52 but of a ninth embodiment of the invention which is identical to the eighth embodiment, however, in which two additional secondary key members 816 are provided on the piston element 57 and two additional secondary keyways 833 are provided on the socket member 100. The provision of the three secondary keyways 833 can be of assistance in coaxially locating the piston element 57 within the socket member by engagement between the radially outwardly directed surfaces of each secondary keyway member 833 and the cylindrical guide wall portion 628 of the socket member 100. While in FIG. 53 three keyways 833 are shown, it is to be appreciated that merely one of the keyways needs to be provided so as to provide an axial stop against relative axial movement.

In the embodiments illustrated in FIGS. 49 to 52, the engagement between the secondary key member 816 and the secondary keyway 833 provides an axial stop. This is not necessary and the axial stop may be provided by some other feature. In the eighth embodiment illustrated in FIGS. 49 to 51, the secondary keyway 833 could be replaced by a slotway on the piston element 57 and the secondary keyway on the socket member 100 could be provided by a key member such that the piston element would have a primary key member 616 and a secondary keyway and the socket member would have a primary keyway and a secondary key member.

In the preferred embodiment, the key member 616 is provided on the piston element 57 and the keyway 633 and the camming shoulder 636 are provided on the socket member 100. This could be reversed with the key member provided on the socket member and the keyway and camming shoulder provided on the piston element 57.

The particular nature of the piston assembly or valve assembly 22 which can be provided is not limited and various arrangements can be provided as, for example, providing merely a one-way outlet valve as the valve assembly 22 or providing pumps which dispense not merely liquids but also foam as, for example, as liquid mixed with air and in which this charge and pumping of the liquid and/or air is either on an instroke and/or outstroke of the piston.

In accordance with the preferred embodiment illustrated in FIGS. 1 to 5, removal of the cartridge 13 from the dispenser requires moving the actuator plate 32 axially. However, various other arrangements could be provided. As another arrangement (not shown), the socket member 100 may be provided to be pivotally mounted to the actuator plate 32 for relative pivoting about an axis parallel to the axis 46 shown in FIG. 1. With such a modified embodiment illustrated in FIGS. 1 to 19, to insert an empty canister, the pivotable socket member 100 may be rotated about its horizontal axis relative to the actuator plate 32 permitting the entire cartridge to be pivoted to a position that piston element 57 can be moved axially relative to the socket member 100 into the socket member 100 following which the actuator plate 32 and container 13 is then pivoted as a unit rearwardly to have the container 13 become engaged with the support flange 24. Preferably, this pivotable support member 100 would be biased or adapted to releasably assume a position as shown in FIG. 1. Providing the pivotable socket member 100 to pivot about a notional horizontal axis could avoid the need for the lower springs 634 and could permit the ferrules 43 to be provided underneath the lower surface 35 of the actuator plate 32. Alternatively, in the arrangement as illustrated in FIG. 1 having the lower springs 634, removal of the cartridge 13 could be accomplished merely by a person grabbing the reservoir 16 and pulling the reservoir 16 forwardly resulting in the socket member 100 pivoting about its horizontal axis until the reservoir 16 is clear of the support flange 24 whereupon the piston element 57 may be axially moved from the pivoted socket member 100 by the user sliding the cartridge 13 parallel the axis 66, that is, by lifting upwardly and forwardly. In an automated dispenser, a mechanism to control the position of the actuator 32 may be controlled to move the actuator 32 to a position as seen in FIG. 2 to insert or remove a cartridge.

Figure 54:
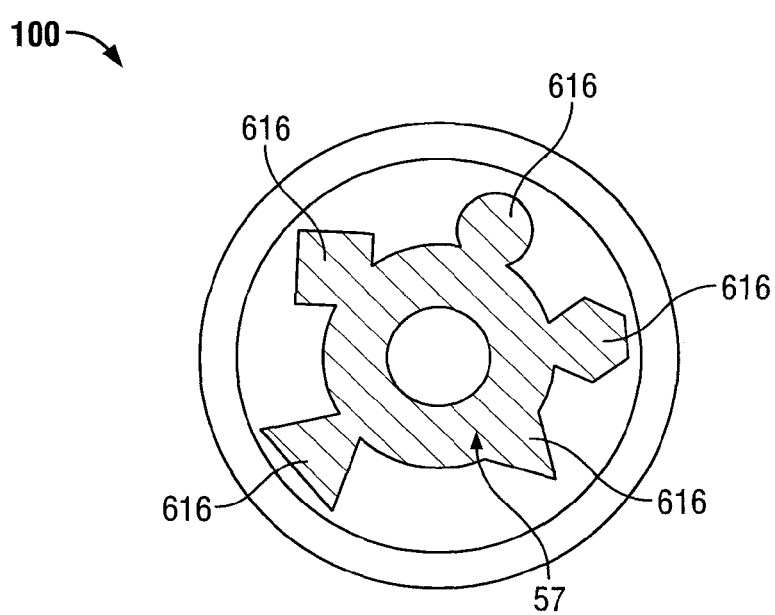
FIG. 54 is a cross-sectional top view the same as FIG. 9 but showing a tenth embodiment of a socket member in accordance with the present invention.

As seen in top view in FIG. 11, the key member 616 has a shape which is complementary to the shape of the keyway 633 as viewed in an axial direction. The shape of the key member 616 and keyway 633 as seen in the axial direction preferably are complementary and may be varied to adopt various unique combinations which could prevent other shapes as being able to relatively slide axially. FIG. 54 schematically illustrates a plan view similar to that shown in FIG. 11 having key member 616 and keyway 633 with five different shapes, each intended, for example, to be a shape which could be adopted, for example, in the first embodiment on one keyway. The shape in which the keyway appears in top view as circular, as a dovetail, as a diamond and as a heagon, eavh have an increase in circumferential extent radially outwardly and are adapted merely for axial insertion and removal whereas the triangular shape in which the circumferential extent decreases radially outwardly could be adapted for either axial relative sliding or radial removal as could be useful in the seventh embodiment of FIG. 41.

The invention has been described with reference to preferred embodiments. Many modifications and variations will now occur to a person skilled in the art. For a definition of the invention, reference is made to following claims.

We claim:

1. A dispenser for dispensing a fluid comprising:
a housing,
a removable reservoir insertable into the housing to assume a dispensing position and
removable from the housing for replacement,
the reservoir comprising:
(i) a chamber for retaining the fluid having an outlet, and
(ii) a valve mechanism disposed across the outlet for dispensing the fluid from the chamber,
the valve mechanism comprising a reciprocally movable element for reciprocal movement along an axis relative to the housing when the reservoir is in the dispensing position to dispense the fluid, an actuator on the housing for engaging the element to reciprocally axially slide the element, the element rotatable about the axis relative the actuator, a lock out key carried on the element, a keyway carried on the actuator, wherein with the element coaxially aligned with the actuator (a) with the element in a desired relative rotational position about the axis relative the actuator with axial sliding of the element relative the actuator, the lock out key is received in the keyway and the actuator couples with the element for reciprocal movement to dispense the fluid and (b) with the element in undesired rotational positions different than the desired rotational position relative the actuator the lock out key is not in the keyway and blocks coupling of the actuator and the element, a cam surface carried on the element, a camming surface carried on the actuator, wherein with the element coaxially aligned with the actuator with axial sliding of the element relative the actuator the cam surface and camming surface engage to rotate the element about the axis from the undesired rotational positions to the desired rotational position.

2. A dispenser as claimed in claim 1 wherein the element is axially slidable relative the actuator with the lock out in the keyway when element is in the desired rotational position about the axis relative the actuator, the lock out key engaging the actuator to block the element from sliding axially relative the actuator when the element is in one of the undesired rotational positions.

3. A dispenser as claimed in claim 1 wherein:

the cam surface is an axially directed surface, and the camming surface is an axially directed surface.

4. A dispenser as claimed in claim 3 wherein:

the housing supporting the reservoir in the dispensing position, the element including an engagement surface for engagement with the actuator, the actuator movable relative the housing between a first position and a second position, the actuator including a catch mechanism to engage the engagement surface and couple the element to the actuator, the keyway comprising an axially extending keyway complementary to the lock out key, the lock out key extending radially outwardly on the element over a limited circumferential extent, the lock out key extending axially on the element, wherein when the reservoir is inserted into the dispensing position with the element disposed coaxially about the axis relative the actuator, the engagement surface and the catch mechanism assume an uncoupled orientation selected from:

(a) an uncoupled rotationally aligned orientation in which the lock out key is in the desired rotational position about the axis relative the keyway such that the lock out key and keyway are axially aligned and from which on a first cycling of the actuator between the first position and the second position, the lock out key slides axially in the keyway and the catch mechanism and the engagement surface are moved axially relative to each other to a coupled orientation in which the catch mechanism engages the engagement surface for reciprocal movement of the element to dispense the with movement of the actuator between the first position and the second position, and (b) an uncoupled rotationally unaligned orientation in which the lock out key is in one of the undesired rotational positions about the axis relative the keyway in which the lock out key and keyway are out of alignment and from which on a first cycling of the actuator between the first position and the second position, the cam surface on the element engage the camming surface on the actuator to rotate the clement from the one undesired rotational position to the desired rotational position whereafter the lock out key slides axially in the keyway and the catch mechanism and the engagement surface are moved axially relative, to each other to a coupled orientation in which the catch mechanism engages the engagement surface for reciprocal movement of the element to dispense the fluid with movement of the actuator between the first position and the second position.

5. A dispenser as claimed in claim 4 wherein the reservoir carrying a piston pump and the element comprises a piston element of the piston pump.

6. A dispenser as claimed in claim 4 wherein the camming surface and the cam surface engage to rotate the element in one of a clockwise direction about the axis and a counterclockwise direction about the axis.

7. A dispenser as claimed in claim 4 wherein the camming surface and the cam surface engage to rotate the element in one or more of a clockwise direction about the axis and a counterclockwise direction about the axis.

8. A dispenser as claimed in claim 7 wherein the actuator defines a hollow cavity within which the element is to be coaxially received with an axial outer end of the element inserted into an axial inner end of the cavity.

9. A dispenser as claimed in claim 8 wherein the cavity having a radially inwardly directed inner wall, the keyway comprising a slot in the inner wall extending axially and extending radially outwardly from the inner wall.

10. A dispenser as claimed in claim 9 wherein the cavity having a radially inwardly directed outer wall axially inward of the inner wall, the camming surface comprising a radially extending shoulder bridging between the inner wall and the outer wall extending circumferentially about a portion of the inner wall and terminating circumferentially at the slot, the shoulder ramped to extend axially outwardly as the shoulder extends circumferentially toward the slot.

11. A dispenser as claimed in claim 10 wherein an axial distance of the camming surface from the inner end of the actuator increasing with circumferential proximity to the keyway.

12. A dispenser as claimed in claim 8 wherein:

the cavity having a radially inwardly directed inner wall, the keyway comprising a plurality of axially extending and radially outwardly extending slots in the inner wall, each slot equally spaced circumferentially about the axis, the cavity having an radially inwardly directed outer wall axially inward of the inner wall, the camming surface comprising a plurality of radially extending shoulders each bridging between the inner wall and the outer wall and extending circumferentially about a portion of the inner wall and terminating circumferentially at one of the slots, each shoulder ramped to extend axially outwardly as each shoulder extends circumferentially toward one of the slots.

13. A dispenser as claimed in claim 10 wherein an axial distance of the camming surface from the inner end of the actuator increasing with circumferential proximity to each keyway at which the camming surface terminates.

14. A dispenser as claimed in claim 13 wherein an axial distance of the camming surface from the inner end of the actuator increasing with circumferential proximity to a closest one of the slots at which the camming surface terminates.

15. A dispenser as claimed in claim 14 wherein a portion of the camming surface on each of the shoulders being identical to each other and equally spaced circumferentially about the axis.

16. A dispenser as claimed in claim 15 wherein the portion of the camming surface on each of the shoulders extends a circumferential extent which is selected from approximately 360 degrees, 180 degrees, 120 degrees, and 90 degrees.

17. A dispenser as claimed in claim 8 wherein engagement between the cam surface and the camming surface providing for rotation of the element in one direction only,
the element received on the reservoir for rotation in the one direction only, an antirotation mechanism provided to prevent rotation of the element in other direction.

18. A dispenser for dispensing a fluid comprising:
a housing.
a removable container insertable into the housing to assume a dispensing position and removable from the housing for replacement,
the container carrying a pump having a piston element reciprocally slidable along an axis for dispensing the fluid from the container with reciprocal axial sliding of the piston element,
an actuator on the housing for engaging the piston element to reciprocally axially slide the piston element,
the piston element rotatable relative the actuator about the axis,
a lock out key carried on the piston element,
a keyway carried on the actuator,
wherein with the piston element coaxially aligned with the actuator (a) with the piston element in a desired relative rotational position about the axis relative the actuator with axial sliding of the piston element relative the actuator, the lock out key is received in the keyway and the actuator couples with the piston element for reciprocal movement to dispense the fluid and (b) with the piston element in undesired rotational positions different than the desired rotational position relative the actuator the lock out key is not in the keyway and blocks coupling of the actuator and the piston element,
an axially directed cam surface carried on the piston element,
an axially directed camming surface carried on the actuator,
wherein with the piston element coaxially aligned with the actuator with axial sliding of the piston element relative the actuator the cam surface and camming surface engage to rotate the piston element about the axis from the undesired rotational positions to the desired rotational position.

19. A dispenser as claimed in claim 18 wherein the camaning surface engages the cam surfaces to rotate the piston element in one or more of a clockwise direction about the axis and a counterclockwise direction about the axis.

20. A dispenser as claimed in claim 19 wherein the actuator defines a hollow cavity within which he piston element is to he coaxially received with an axial outer end of the piston element inserted into an axial inner end of the cavity.

21. A dispenser as claimed in claim 20 wherein the cavity having a radial inwardly directed inner wall,
the keyway comprising slot in the inner wall extending axially and extending radially outwardly from inner wall.

22. A dispenser as claimed in claim 21 where the cavity having a radially inwardly directed outer wall axially inward of the inner wall,
the camming surface comprising a radially extending shoulder bridging between the inner wall and the outer wall extending circumferentially about a portion of the inner wall and terminating circumferentially at the slot,
the shoulder ramped to extend axial outwardly as the shoulder extends circumferentially toward the slot,
wherein an axial distance of the camming surface from the inner end of the actuator increases with circumferential proximity to the keyway.

\* \* \* \* \*